(12) United States Patent
Cho

(10) Patent No.: US 11,604,620 B2
(45) Date of Patent: Mar. 14, 2023

(54) DISPLAY APPARATUS

(71) Applicant: LG Display Co., Ltd., Seoul (KR)

(72) Inventor: Seokhyo Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 214 days.

(21) Appl. No.: 17/078,493

(22) Filed: Oct. 23, 2020

(65) Prior Publication Data

US 2021/0141587 A1   May 13, 2021

(30) Foreign Application Priority Data

Nov. 8, 2019  (KR) .................. 10-2019-0142766

(51) Int. Cl.
*G06F 1/16*   (2006.01)
*G06F 3/16*   (2006.01)
*H05K 5/00*   (2006.01)
*G09F 9/30*   (2006.01)
(Continued)

(52) U.S. Cl.
CPC .............. *G06F 3/16* (2013.01); *G06F 1/1605* (2013.01); *G09F 9/301* (2013.01); *G10K 9/12* (2013.01); *H04R 9/06* (2013.01)

(58) Field of Classification Search
CPC ..... G06F 1/16; G06F 3/01; G06F 3/14; G06F 3/16; G06F 3/147; G06F 1/1605; G09G 5/00; G09G 5/10; G09G 5/14; G09G 3/22; G09G 3/3216; G10K 9/12; G09F 9/30; G09F 9/32; G09F 9/33; G09F 13/04; G09F 19/02; G09F 9/301; H04R 1/02; H04R 1/32; H04R 7/04; H04R 9/02; H04R 9/06; H04R 25/00; H05K 1/00; H05K 1/02; H05K 7/00; H05K 7/14; H05K 5/00; H05K 5/02; H05K 5/03; H05K 5/01; F16M 11/04; F16M 11/08; F16M 11/22; F16M 11/18; H04N 5/44; H04N 5/64; H04N 9/30;
(Continued)

(56) References Cited

U.S. PATENT DOCUMENTS 9,081,540 B1   7/2015 Cho et al.
2014/0240906 A1*  8/2014 Seo .................. H04M 1/0268
                                                          361/679.01
2015/0145837 A1   5/2015 Park et al.
(Continued)

FOREIGN PATENT DOCUMENTS

CN   103093699 A   5/2013
CN   105993044 A   10/2016
(Continued)

OTHER PUBLICATIONS

Extended European Search Report issued in corresponding European Patent Application No. 20205105.8 dated Apr. 30, 2021.
(Continued)

*Primary Examiner* — Chanh D Nguyen
*Assistant Examiner* — Nguyen H Truong
(74) *Attorney, Agent, or Firm* — Morgan, Lewis & Bockius LLP

(57) ABSTRACT

A display apparatus includes a display unit including a display panel configured to display an image, a curvature variation unit disposed on a rear surface of the display unit and varying a curvature of the display unit, and a vibration unit disposed on the rear surface of the display unit configured to vibrate the display panel.

20 Claims, 17 Drawing Sheets

(51) Int. Cl.
*G10K 9/12* (2006.01)
*H04R 9/06* (2006.01)

(58) Field of Classification Search
CPC ...... G02F 1/133; G02F 1/1333; G02F 1/1335; H01L 27/32; H01L 51/52
See application file for complete search history.

(56) References Cited

U.S. PATENT DOCUMENTS

| | | |
|---|---|---|
| 2015/0341714 A1 | 11/2015 | Ahn et al. |
| 2016/0050472 A1* | 2/2016 | Lee ................. H04R 7/045 381/333 |
| 2016/0154435 A1 | 6/2016 | Yanagisawa |
| 2016/0196035 A1 | 7/2016 | Lee et al. |
| 2017/0105301 A1* | 4/2017 | Sun ................. H04N 5/64 |
| 2017/0280215 A1 | 9/2017 | Lee et al. |
| 2017/0280234 A1 | 9/2017 | Choi et al. |
| 2018/0074675 A1 | 3/2018 | Soh et al. |
| 2018/0317012 A1* | 11/2018 | Lee ................. H04R 7/045 |
| 2019/0012137 A1 | 1/2019 | Lim et al. |
| 2019/0018448 A1 | 1/2019 | Lee et al. |
| 2020/0323087 A1 | 10/2020 | Hwang et al. |

FOREIGN PATENT DOCUMENTS

| | | |
|---|---|---|
| EP | 3557370 A | 10/2019 |
| JP | 2015-219528 A | 12/2015 |
| JP | 2015-219540 A | 12/2015 |
| JP | 2016-110117 A | 6/2016 |
| JP | 2017-184223 A | 10/2017 |
| JP | 2018-506766 A | 3/2018 |
| JP | 2018-110369 A | 7/2018 |
| KR | 2016-0050698 A | 5/2016 |
| KR | 2016-0084259 A | 7/2016 |
| KR | 2018-0029477 A | 3/2018 |
| WO | 2018/097633 A1 | 5/2018 |

OTHER PUBLICATIONS

Office Action issued in corresponding Chinese Patent Application No. 2020-11228294.5 dated Jun. 2, 2022.
Office Action, issued in corresponding Japense Patent Application No. 2020-183464, dated Sep. 14, 2021.
Partial European Search Report issued in corresponding European Patent Application No. 20205105.8 dated Feb. 17, 2021.

* cited by examiner

200: 210, 220, 230, 240, 250
220: 221, 222, 223, 224, 225, 227

220: 221, 222, 223, 224, 225, 227

270: 271, 272, 273, 274, 275, 276, 277

DISPLAY APPARATUS

CROSS-REFERENCE TO RELATED APPLICATIONS

This application claims the benefit of the Korean Patent Application No. 10-2019-0142766 filed on Nov. 8, 2020, which is hereby incorporated by reference as if fully set forth herein.

BACKGROUND

Technical Field

The present disclosure relates to a display apparatus, and more particularly, to a curved display apparatus.

Discussion of the Related Art

With the advancement of information-oriented society, various requirements for display apparatuses for displaying an image are increasing. Recently, as a display screen of each display apparatus is enlarged with having a flat type, there is a problem where a deviation between a viewing distance to a screen center region and a viewing distance to each of both side regions of the screen increases.

In order to decrease a viewing distance deviation and maximize the immersion of a user watching an image, a curved display apparatus where a flat display panel is curved at a certain curvature has been proposed. In a display apparatus of the related art, since a display panel maintains a state which is curved at a certain curvature, a curvature of the display panel may not vary (or change) on the basis of a selection (or preference) of a user (or a viewer).

Moreover, in a curved display apparatus of the related art, since a sound output from a sound device for outputting a sound associated with an image travels in a forward direction or a downward direction with respect to a display panel, sound quality may be degraded due to interference between sounds reflected by walls or the ground, and due to this, it may be difficult to accurately transfer a sound and the immersion of a viewer may be reduced.

Therefore, in the curved display apparatus of the related art, the immersion of a user watching an image may be maximized through a screen which is curved at a certain curvature but it may be difficult to accurately transfer a sound, causing a reduction in acoustic immersion of the user.

SUMMARY

The inventor has recognized problems of a curved display apparatus of the related art and has performed various experiments on a display apparatus, which may vary (or change) a curvature of a display panel (or a display unit), and a display apparatus which may vary a curvature of a display panel and may output a sound in a forward direction with respect to the display panel to maximize the immersion of a user (or a viewer) watching an image. Through the various experiments, the inventor has invented a display apparatus having a new structure, which may vary a curvature of a display panel, and a display apparatus having a new structure, which may maximize the immersion of a user watching an image.

Accordingly, embodiments of the present disclosure are directed to a display apparatus that substantially obviates one or more problems due to limitations and disadvantages of the related art.

An aspect of the present disclosure is to provide a display apparatus that may maintain a display panel as a flat type or may vary a curvature of the display panel.

An aspect of the present disclosure is to provide a display apparatus that may maximize the immersion of a user (or a viewer) watching an image.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display apparatus comprises a display unit including a display panel configured to display an image, a curvature variation unit disposed on a rear surface of the display unit and varying a curvature of the display unit, and a vibration unit disposed on the rear surface of the display unit and configured to vibrate the display panel.

In another aspect, a display apparatus comprises a display unit including a display panel configured to display an image and a curvature variation unit disposed on a rear surface of the display unit and varying a curvature of the display unit, wherein the curvature variation unit includes a first arc member and a second arc member respectively disposed in a first rear region and a second rear region of the display unit parallel to a first direction, each of the first arc member and the second arc member having a curved shape, a driver disposed in a rear center region of the display unit to simultaneously rotate a center portion of each of the first arc member and the second arc member, a guider disposed on the rear surface of the display unit in parallel with a second direction intersecting with the first direction to movably support a center portion between a center portion and both ends of each of the first arc member and the second arc member, and a fixing bracket disposed in each of a third rear edge portion and a fourth rear edge portion of the display unit parallel to the second direction intersecting with the first direction, and the fixing bracket transfers pressure, applied to an end of each of the first arc member and the second arc member rotating based on driving of the driver, to each of the third rear edge portion and the fourth rear edge portion of the display unit.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION

Figure 1:
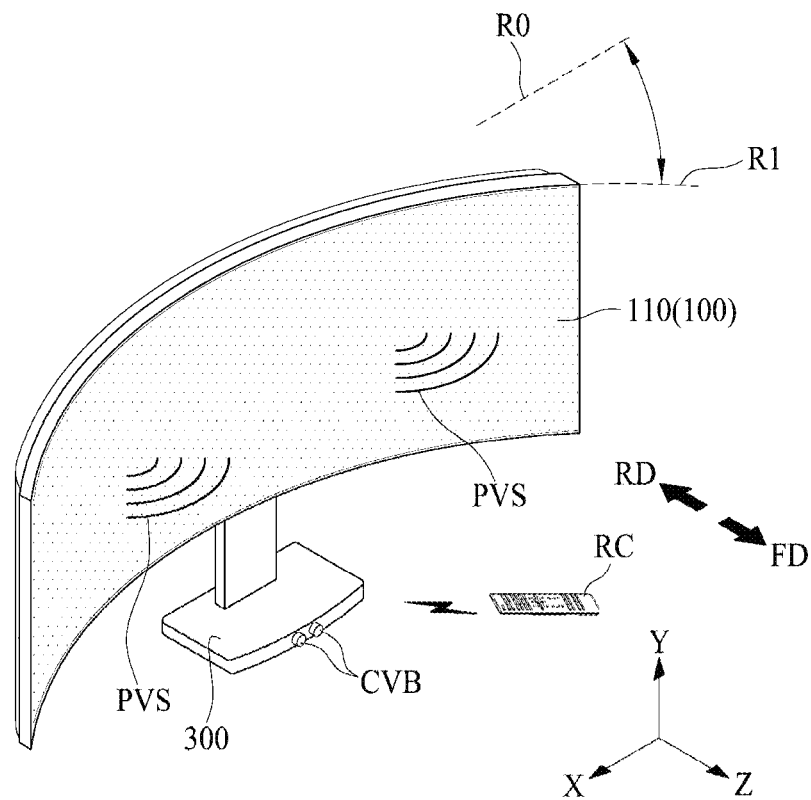
FIG. 1 is a front perspective view illustrating a display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it may be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

Features of various embodiments of the present disclosure may be partially or overall coupled to or combined with each other, and may be variously inter-operated with each other and driven technically as those skilled in the art may sufficiently understand. The embodiments of the present disclosure may be carried out independently from each other, or may be carried out together in co-dependent relationship.

Hereinafter, embodiments of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

Figure 2:
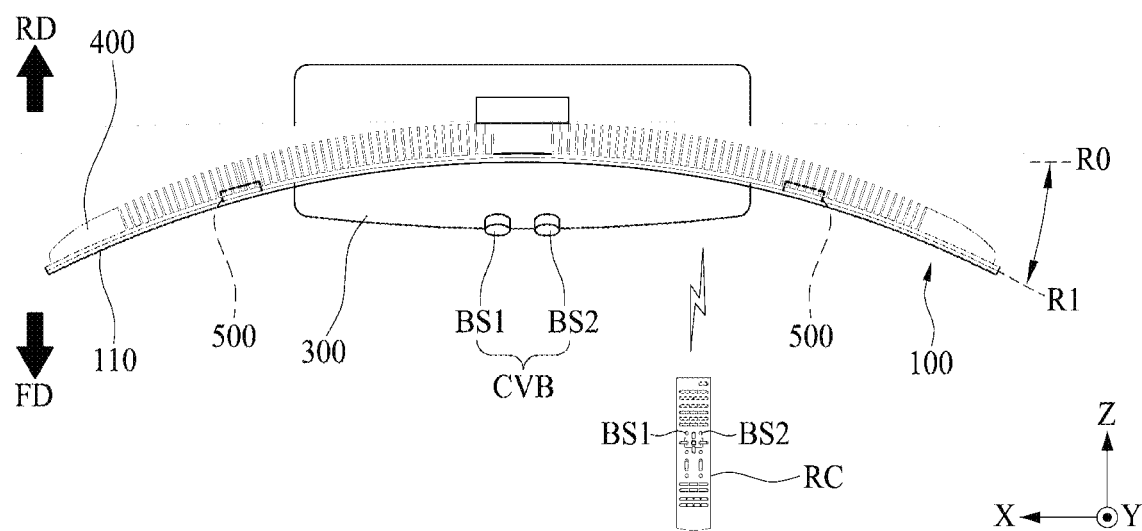
FIG. 2 is a plan view illustrating a display apparatus according to an embodiment of the present disclosure.
Figure 3:
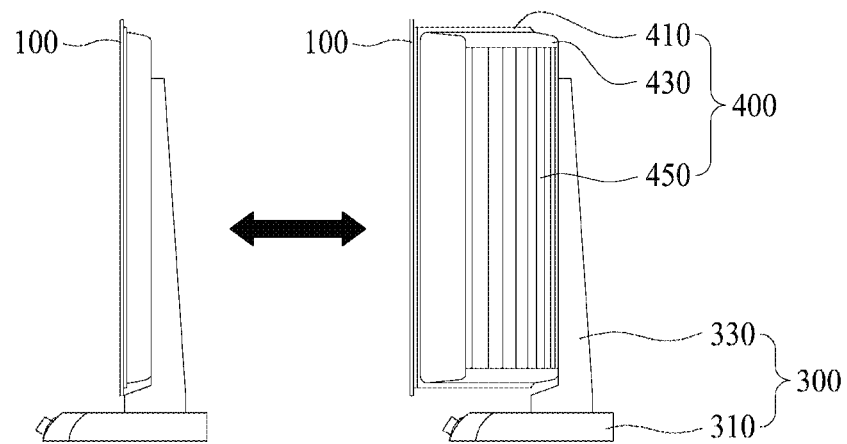
FIG. 3 is a side view illustrating a flat shape and a curved shape of a display apparatus according to an embodiment of the present disclosure.

FIG. 1 is a front perspective view illustrating a display apparatus according to an embodiment of the present disclosure, FIG. 2 is a plan view illustrating a display apparatus according to an embodiment of the present disclosure, and FIG. 3 is a side view illustrating a flat shape and a curved shape of a display apparatus according to an embodiment of the present disclosure.

Referring to FIGS. 1 to 3, the display apparatus according to an embodiment of the present disclosure may include a display unit 100 implemented to display an image and a curvature variation unit which varies the display unit 100 to a flat shape (or a flat mode) or a curved shape (or a curved mode) in response to a selection (or manipulation) of a user.

The display unit 100 may be mounted on a stand 300 or a wall-mounted bracket in an upright state. For example, the stand 300 or the wall-mounted bracket may be connected (or coupled) to a curvature variation unit or a rear surface of the display unit 100. Additionally, the display unit 100 may be tilted in a forward-rearward direction or may move in an upward-downward direction, with being mounted on the stand 300 or the wall-mounted bracket.

The display unit 100 according to an embodiment may vary to a flat shape or a curved shape according to driving of the curvature variation unit based on manipulation of a user performed through a curvature variation button part CVB disposed in the stand 300. For example, when the display unit 100 has a flat shape which has a curvature (or a first curvature) R0 of 0 (zero), the curvature variation unit may vary the display unit 100 to a curved shape which has a curvature (or a second curvature) R1 other than 0 (zero), in response to manipulation of the user performed through a first button switch BS1 of the curvature variation button part CVB. For example, the curvature variation unit may gradually vary a curvature of the display unit 100 on the basis of a manipulation time (or a push duration time) of the first button switch BS1, or may curve (or vary) the display unit 100 at a predetermined curvature R1 on the basis of one-time manipulation (or one-time push) of the first button switch BS1. On the other hand, when the display unit 100 has a curved shape which has the curvature R1 other than 0 (zero), the curvature variation unit may vary or restore the display unit 100 to a flat shape which has the curvature R0 of 0 (zero), in response to manipulation of the user performed through a second button switch BS2 of the curvature variation button part CVB.

According to another embodiment, the display unit 100 may vary to a flat shape or a curved shape according to driving of the curvature variation unit based on manipulation of the user performed through a remote controller RC which supports a close-distance wireless interface. For example, when the display unit 100 has a flat shape which has the curvature R0 of 0 (zero), the curvature variation unit may gradually vary the curvature of the display unit 100 on the basis of a manipulation time (or a push duration time) of the user performed through a first button BS1 of the remote controller RC, or may curve (or vary) the display unit 100 at the predetermined curvature R1 on the basis of one-time manipulation (or one-time push) of the first button BS1. On the other hand, when the display unit 100 has a curved shape which has the curvature R1 other than 0 (zero), the curvature variation unit may vary or restore the display unit 100 to a flat shape which has the curvature R0 of 0 (zero), in response to manipulation of the user performed through a second button BS2 of the remote controller RC.

When the display unit 100 of the display apparatus according to an embodiment of the present disclosure displays an image or does not display an image, the display unit 100 may perform a function of a vibration plate which outputs a sound PVS in a forward direction FD with respect to the display apparatus. To this end, the display apparatus according to an embodiment of the present disclosure may further include a vibration unit 500 which is disposed on the rear surface of the display unit 100.

The vibration unit 500 may be implemented so that, by using the display unit 100 as a vibration plate, the sound PVS generated based on a vibration of the display unit 100 is output in the forward direction FD with respect to the display apparatus. For example, the vibration unit 500 may vibrate the display unit 100 in response to a sound signal (or a voice signal), thereby generating the sound PVS (or a panel vibration sound) on the basis of a vibration (or a panel vibration) of the display unit 100.

The vibration unit 500 according to an embodiment may be disposed in each of a first vibration region (or a first region) and a second vibration region (or a second region) of the display unit 100. The display unit 100 may output a first sound (or a left sound) and a second sound (or a right sound), respectively generated based on vibrations of the first vibration region and the second vibration region, in the forward direction FD to realize a stereo sound.

The display apparatus according to an embodiment of the present disclosure may further include a rear curtain unit 400 which is implemented on the rear surface of the display unit 100 to cover the curvature variation unit.

The rear curtain unit 400 may be deformed to correspond to a curvature variation of the display unit 100 based on driving of the curvature variation unit, thereby preventing a mechanism (or structure) disposed on the rear surface of the display unit 100 from being exposed at the outside of a side surface thereof. The rear curtain unit 400 will be described below.

The display apparatus according to an embodiment of the present disclosure may provide the display unit 100 (or a display screen) which may vary in a flat shape or a curved shape on the basis of a selection (or preference) of a user (or a viewer) watching an image, thereby maximizing the immersion of the viewer through the display unit 100 (or the display screen) which is curved in a curved shape. Also, the display apparatus according to an embodiment of the present disclosure may output a sound in the forward direction FD (a direction toward a face of the viewer) with respect to the display unit 100 on the basis of a vibration of the display unit 100, and thus, may provide the viewer with the sound PVS having accurate and improved sound quality without loss or distortion, thereby providing a display apparatus for increasing the acoustic immersion of a viewer. Also, the display apparatus according to an embodiment of the present disclosure may output a sound in the forward direction FD (the direction toward the face of the viewer) with respect to the display unit 100 on the basis of a vibration of the display unit 100 (or the display screen) which is curved in a curved shape, and thus, may prevent or minimize a sense of difference (or mismatch) caused by a distance difference between an image and a sound and may provide the viewer with the sound PVS having accurate and improved sound quality without loss or distortion, thereby maximizing the immersion of a user (or a viewer) watching an image.

Figure 4:
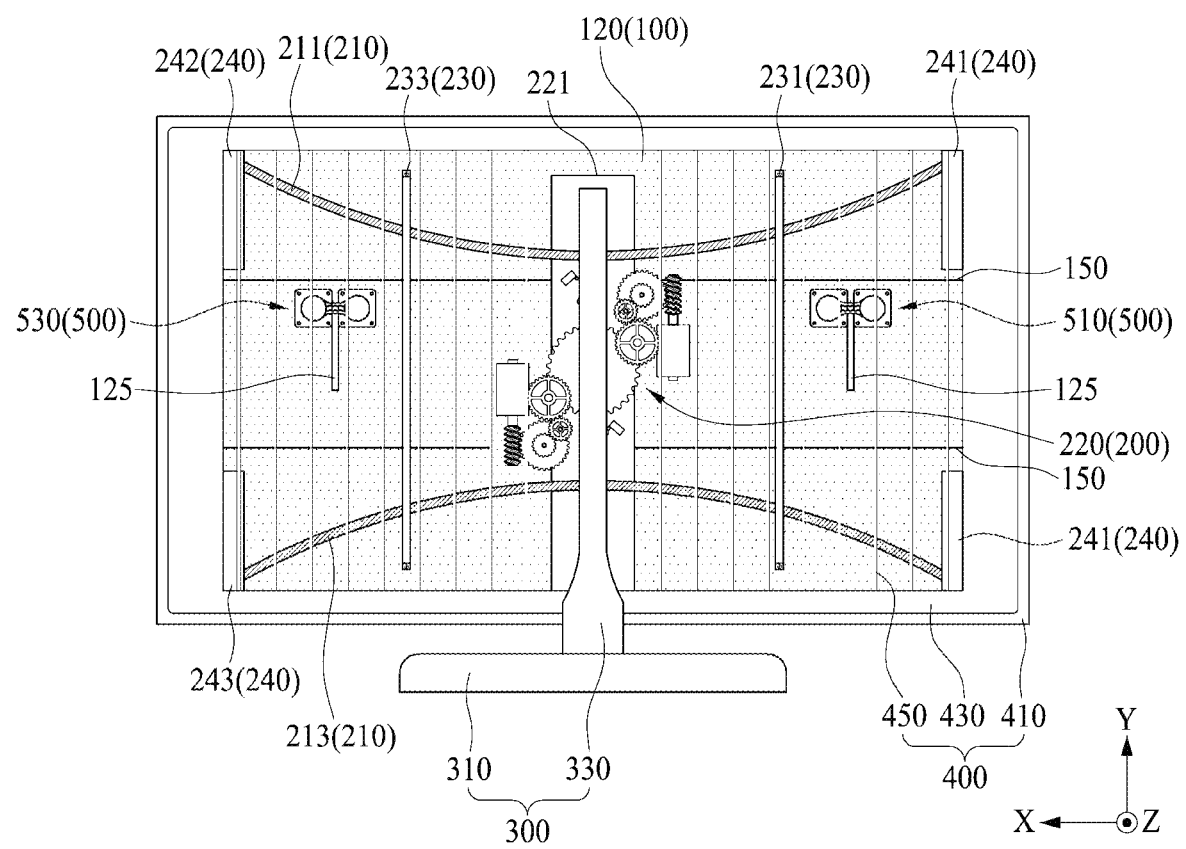
FIG. 4 is a rear view of a display apparatus according to an embodiment of the present disclosure.
Figure 5:
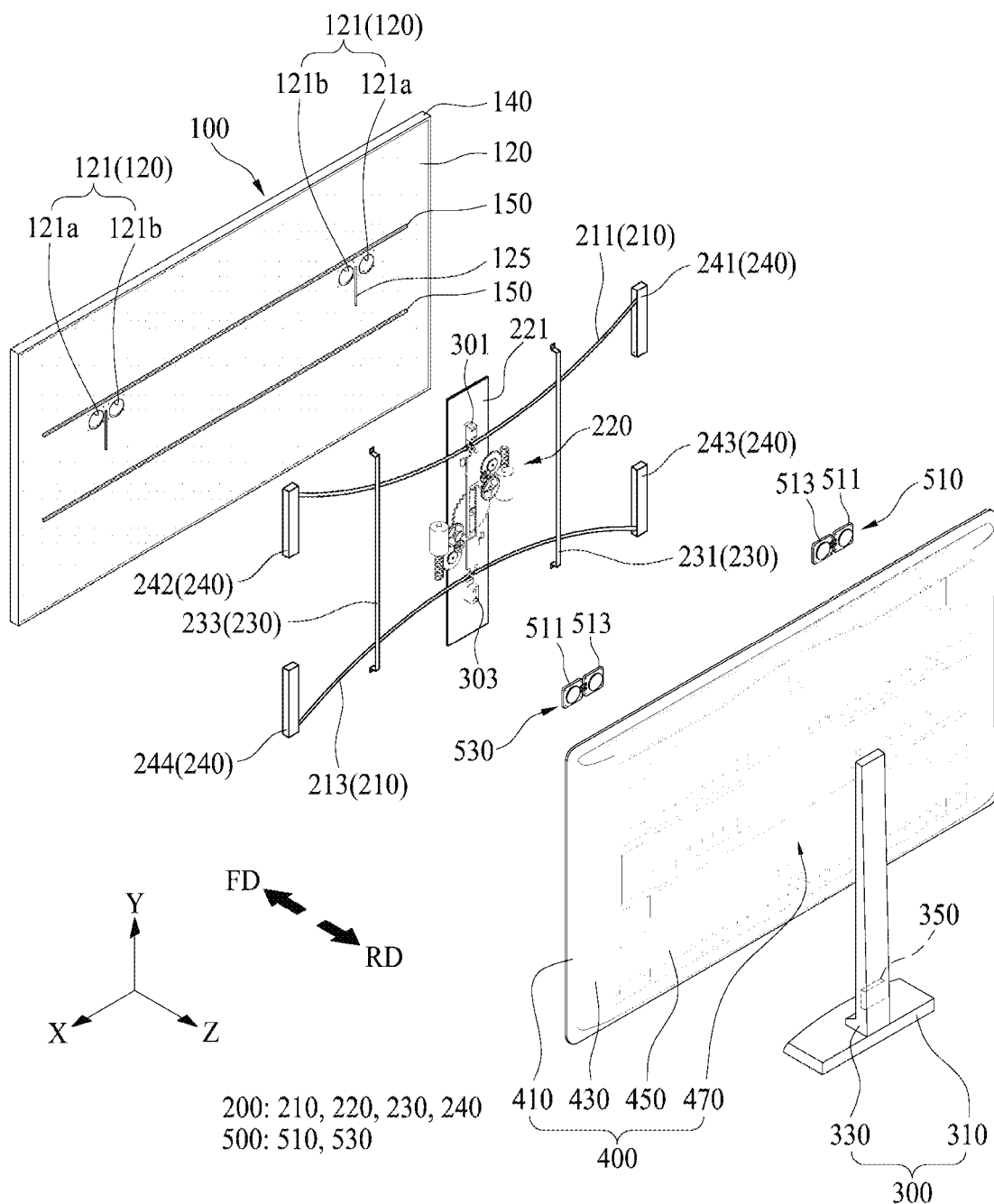
FIG. 5 is an exploded perspective view of a display apparatus according to an embodiment of the present disclosure.
Figure 6:
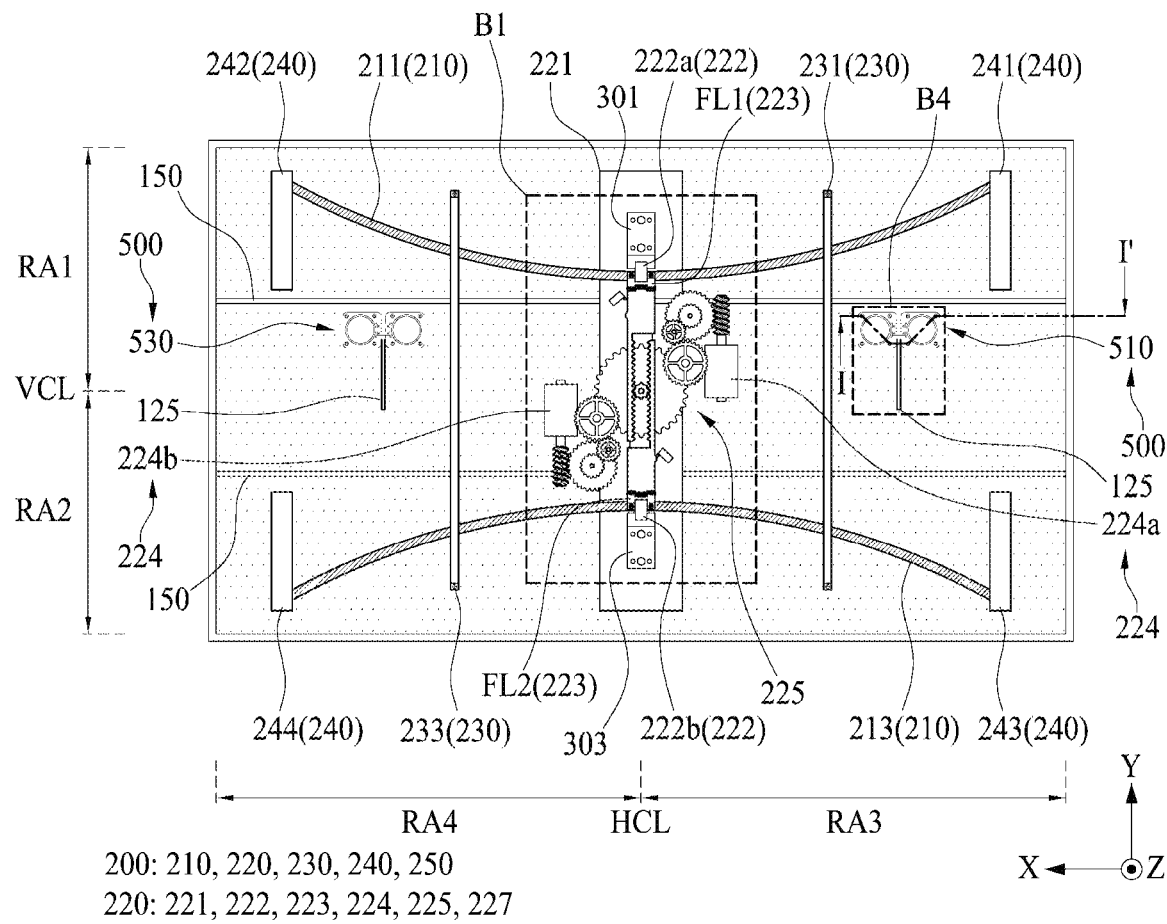
FIG. 6 is a diagram illustrating a curvature variation unit and a vibration unit each disposed on a rear surface of a display unit illustrated in FIG. 5.
Figure 7:
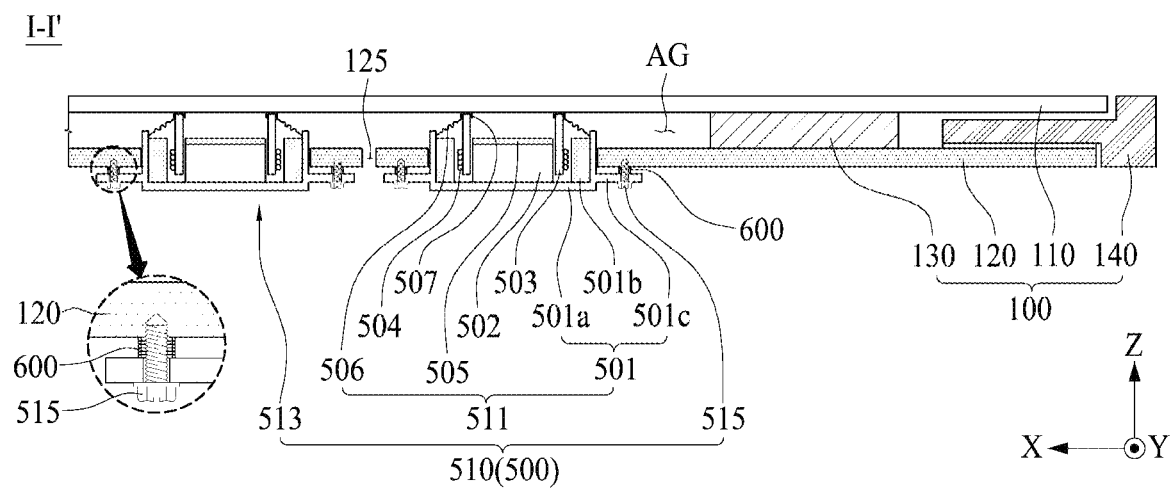
FIG. 7 is a cross-sectional view taken along line I-I' illustrated in FIG. 6.

FIG. 4 is a rear view of a display apparatus according to an embodiment of the present disclosure, FIG. 5 is an exploded perspective view of a display apparatus according to an embodiment of the present disclosure, FIG. 6 is a diagram illustrating a curvature variation unit and a vibration unit each disposed on a rear surface of a display unit illustrated in FIG. 5, and FIG. 7 is a cross-sectional view taken along line I-I' illustrated in FIG. 6.

Referring to FIGS. 4 to 7, the display apparatus according to an embodiment of the present disclosure may include a display unit 100, a curvature variation unit 200, and a stand 300.

The display unit 100 may be a screen of the display apparatus and may display an image. For example, the display unit 100 may display an image by using a plurality of pixels each including a self-emitting display device. Additionally, the display unit 100 may perform a function of a touch sensor which senses a user touch.

The display unit 100 according to an embodiment, as illustrated in FIG. 7, may include a display panel 110 and a back cover 120.

The display panel 110 may include a self-emitting display panel or a curved self-emitting display panel, which may be bent. For example, the display panel 110 may include a light emitting display panel, a micro light emitting diode display panel, a flexible light emitting display panel, a flexible micro light emitting diode display panel, or a quantum dot light emitting display panel, but is not limited thereto.

The display panel 110 according to an embodiment may include a pixel array layer, which is disposed on a base substrate and includes a plurality of pixels, and an encapsulation member which covers the pixel array layer.

Each of the plurality of pixels may include a light emitting device layer. The light emitting device layer may be implemented in a top emission structure, where light passes through the encapsulation member and is discharged to the outside, or a bottom emission structure where light passes through the base substrate and is discharged to the outside. Herein, an example where the light emitting device layer is implemented in the top emission structure will be described.

The encapsulation member may be implemented to cover the pixel array layer, and thus, may include a function of protecting the light emitting device layer from oxygen and/or water. For example, the encapsulation member based on the top emission structure may be transparent, and the encapsulation member based on the bottom emission structure may be opaque.

The display panel 110 according to an embodiment may further include a touch sensor layer (or a touch electrode layer) for sensing a touch position of a user. When the light emitting device layer has the top emission structure, the touch sensor layer may be disposed on the encapsulation member. When the light emitting device layer has the bottom emission structure, the touch sensor layer may be disposed on the base substrate.

The back cover 120 may implement a rear structure of the display unit 100. The back cover 120 may be disposed on a rear surface of the display panel 110 and may cover or support the rear surface of the display panel 110.

The back cover 120 according to an embodiment may include a metal material or a metal alloy material. For example, the back cover 120 may include one material of aluminum (Al), an Al alloy, a magnesium (Mg) alloy, an alloy of iron (Fe) and nickel (Ni), and stainless steel, an alloy material thereof, or a junction structure thereof, but is not limited thereto.

The back cover 120 according to an embodiment may be connected (or coupled) to the rear surface of the display panel 110 by a cover connection member 130.

The cover connection member 130 may be disposed (or interposed) between the back cover 120 and the rear surface of the display panel 110. The cover connection member 130 may provide an air gap AG between the back cover 120 and the rear surface of the display panel 110.

The cover connection member 130 according to an embodiment may include an adhesive resin, a double-sided tape, or a double-sided adhesive foam pad and may have elasticity for absorbing an impact.

The cover connection member 130 according to an embodiment may include a magnet. For example, the cover connection member 130 may include a rubber magnet, but is not limited thereto.

The display unit 100 according to an embodiment may further include a middle frame 140.

The middle frame 140 may be disposed between a rear edge portion of the display panel 110 and a front edge portion of the back cover 120. The middle frame 140 may surround all of an outer surface (or an outer sidewall) of the display panel 110 and an outer surface (or an outer sidewall) of the back cover 120 to protect an outer surface of each of the display panel 110 and the back cover 120, thereby improving an outer design of a side surface of the display apparatus. For example, the middle frame 140 may be referred to as a middle cabinet, a middle cover, or a middle chassis, but the terms are not limited thereto.

The middle frame 140 according to an embodiment may include a supporting part, which supports an edge portion of each of the display panel 110 and the back cover 120, and a sidewall portion which surrounds a side surface of each of the display panel 110 and the back cover 120. For example, the middle frame 140 may have a picture frame structure having a ⊢-shaped or ⊣-shaped cross-sectional structure where the supporting part and the sidewall portion are provided as one body.

In the middle frame 140 according to an embodiment, a first surface of the supporting part may be coupled to the rear edge portion of the display panel 110 by an adhesive member, and a second surface of the supporting part may be coupled to the front edge portion of the display panel 120 by an adhesive member.

In the middle frame 140 according to an embodiment, the first surface of the supporting part may be apart from the rear edge portion of the display panel 110, and the second surface of the supporting part may be coupled to the front edge portion of the display panel 120 by an adhesive member.

The middle frame 140 according to an embodiment may include a metal material or a plastic material. For example, the middle frame 140 may include a metal material for improving an outer design of the side surface of the display apparatus and protecting the side surface of the display apparatus, but a metal material is not limited thereto.

Referring to FIGS. 4 to 6, the display unit 100 according to an embodiment may further include at least one stiff member 150.

The at least one stiff member 150 may be disposed on a rear surface of the display unit 100 in parallel with a first direction X. The at least one stiff member 150 according to an embodiment may be connected (or coupled) to a rear center region of the display unit 100 parallel to the first direction X. The at least one stiff member 150 may be implemented to have a certain length parallel to the first direction X and a certain width parallel to a second direction Y intersecting with the first direction X. For example, the at least one stiff member 150 may include a metal material, but is not limited thereto. The at least one stiff member 150 may be fixed to a rear surface of the back cover 120 by a coupling member such as a screw or a bolt, but is not limited thereto and may be fixed to the rear surface of the back cover 120 by a coupling member such as a double-sided tape.

The curvature variation unit 200 may be disposed on the rear surface of the display unit 100 to vary a curvature of the display unit 100. For example, the curvature variation unit 200 may be disposed on the rear surface of the back cover 120.

The curvature variation unit 200 may move (or forward move) both side portions of the display unit 100 in a forward direction FD with respect to the display apparatus in response to manipulation of a user (or a viewer), and thus, the both side portions (or rear edge portions) of the display unit 100 may protrude in the forward direction FD with respect to a center portion of the display apparatus. Therefore, as the both side portions of the display unit 100 protrude in the forward direction FD with respect to a center portion of the display apparatus, the display unit 100 may vary in a curved shape which has a curvature other than 0 (zero). For example, as seen from a viewer located in front of the display apparatus, the display unit 100 varied in a curved shape may have a curved shape where a center portion thereof is bent concavely from both side portions thereof. The display unit 100 having a curved shape may provide a user with an image which has three-dimensionality and is high in immersion. For example, the display unit 100 having a curved shape may be implemented when one user instead of a plurality of users is watching an image, but the present disclosure is not limited thereto.

The curvature variation unit 200 may move (or rearward move) the both side portions of the display unit 100, which has protruded in the forward direction FD with respect to the display apparatus, in a rearward direction RD with respect to the display apparatus in response to manipulation of the user, and thus, may restore the both side portions of the display unit 100 to the same plane as the both side portions of the display unit 100. Therefore, the display unit 100 may vary in a flat shape which has a curvature of 0 (zero) as the both side portions and the center portion are disposed on the same plane. The display unit 100 having a flat shape may be implemented when a plurality of users instead of one user are watching an image, but the present disclosure is not limited thereto.

The curvature variation unit 200 according to an embodiment may include an arc member 210, a driver 220, and a guider 230.

The arc member 210 may be disposed on the rear surface of the display unit 100. For example, the arc member 210 may be disposed on the rear surface of the back cover 120.

The arc member 210 according to an embodiment have a curved shape. For example, the arc member 210 may be referred to as a curvature variation member or a curvature changing member, a curvature variation rod, a curvature variation bar, or a curvature variation pipe, but the terms are not limited thereto.

The arc member 210 may rotate based on driving of the driver 220 to move the both side portions of the display unit 100 in the forward direction FD or the rearward direction RD with respect to the display apparatus. For example, based on driving of the driver 220, the arc member 210 may rotate by a maximum of 90 degrees in a first rotational direction at a fixed position (or in place) or may rotate by a maximum of 90 degrees in a second rotational direction opposite to the first direction. For example, the first rotational direction may be a forward-direction rotation or a clockwise rotation and the second rotational direction may be a reverse-direction rotation or a counterclockwise rotation, but the present disclosure is not limited thereto and the directions may be defined as the opposite.

The arc member 210 according to an embodiment may include a first arc member 211 and a second arc member 213.

The first arc member 211 may be disposed in a first rear region RA1 of the display unit 100 parallel to the first direction X. For example, the first arc member 211 may be disposed in a first rear region RA1 of the back cover 120. The first rear region RA1 may be an upper rear region adjacent to a first long side of the rear surface of the display unit 100 with respect to an upright state or the second direction Y. For example, the first rear region RA1 of the back cover 120 may be between the first long side and a rear center region of the display unit 100 parallel to the first direction X.

The first arc member 211 may have a curved shape. The first arc member 211 may have a curved shape which is convex toward a rear center portion of the display unit 100. A center portion (or a length center portion) of the first arc member 211 may be adjacent to the rear center portion of the display unit 100, and both ends (or both side portions) of the first arc member 211 may be adjacent to a left upper corner portion and a right upper corner portion, where each of a first short side and a second short side is connected to the first long side, of the display unit 100. For example, one end (or a first end) of the first arc member 211 may be adjacent to the right upper corner portion of the display unit 100, and the other end (or a second end) of the first arc member 211 may be adjacent to the left upper corner portion of the display unit 100.

The second arc member 213 may be disposed in a second rear region RA2 of the display unit 100 parallel to the first direction X. The second arc member 213 may be disposed in a second rear region RA2 of the back cover 120. The second rear region RA2 may be a lower rear region adjacent to a second long side of the rear surface of the display unit 100 with respect to an upright state or the second direction Y. The second rear region RA2 of the back cover 120 may be between the second long side and the rear center region of the display unit 100.

The second arc member 213 may have a curved shape. The second arc member 213 may have a curved shape which is convex toward the rear center portion of the display unit 100. A center portion (or a length center portion) of the second arc member 213 may be adjacent to the rear center portion of the display unit 100, and both ends (or both side portions) of the second arc member 213 may be adjacent to a left lower corner portion and a right lower corner portion, where each of the first short side and the second short side is connected to the second long side, of the display unit 100. For example, one end (or a first end) of the second arc member 213 may be adjacent to the right lower corner portion of the display unit 100, and the other end (or a second end) of the second arc member 213 may be adjacent to the left lower corner portion of the display unit 100.

The first arc member 211 and the second arc member 213 may be disposed on the rear surface of the display unit 100 so as to be symmetrical with each other with a vertical center line VCL or the rear center region of the display unit 100. Here, the vertical center line VCL of the display unit 100 may be disposed at a center portion of a short-side length (or a lengthwise length) of the display unit 100.

Each of the first arc member 211 and the second arc member 213 according to an embodiment may include a curved shape having a curvature corresponding to a maximum curvature of the display unit 100, which is to be implemented. Each of the first arc member 211 and the second arc member 213 may be an arc rod, an arc bar, or an arc pipe, which includes a circular cross-sectional surface and has a curved shape. For example, each of the first arc member 211 and the second arc member 213 may include a metal material, but is not limited thereto.

The driver 220 may be disposed in the rear center region of the display unit 100. The driver 220 may be disposed between the first arc member 211 and the second arc member 213.

The driver 220 may simultaneously drive each of the first arc member 211 and the second arc member 213. The driver 220 may simultaneously rotate the first arc member 211 and the second arc member 213 in opposite rotational directions at a fixed position (or in place). For example, the driver 220 may rotate the first arc member 211 by a maximum of 90 degrees in the first rotational direction at a fixed position, and simultaneously, may rotate the second arc member 213 by a maximum of 90 degrees in the second rotational direction at a fixed position. On the other hand, the driver 220 may rotate the first arc member 211 by a maximum of 90 degrees in the second rotational direction at a fixed position, and simultaneously, may rotate the second arc member 213 by a maximum of 90 degrees in the first rotational direction at a fixed position.

The driver 220 may simultaneously rotate the first arc member 211 and the second arc member 213 at a fixed position by using a rectilinear motion based on a rotational motion of a rotary motor.

The guider 230 may be disposed on the rear surface of the display unit 100 in parallel with the second direction Y and may movably support each of a first center portion and a second center portion of the arc member 210. The first center portion of the arc member 210 may be a center (or a left center) between the center portion and the one end (or the first end) of the arc member 210, and the second center portion of the arc member 210 may be a center (or a right center) between the center portion and the other end (or the second end) of the arc member 210. The guider 230 may prevent the partial detachment or lifting of the arc member 210 when the arc member 210 having a curved shape is rotating.

Each of one side (or a first side) and the other side (or a second side) of the guider 230 may be fixed to the rear surface of the display unit 100. Each of the one side and the other side of the guider 230 may be fixed to the rear surface of the back cover 120. A center portion between the one side and the other side of the guider 230 may be apart from the rear surface of the display unit 100. Therefore, the arc member 210 may be movably disposed in a separation space between the rear surface of the display unit 100 and the center portion of the guider 230, and thus, the guider 230 may prevent the partial detachment or lifting of the arc member 210 when the arc member 210 is rotating and both side portions of the display unit 100 may protrude in the forward direction FD with respect to the display apparatus by using the guider 230 as a supporter.

The guider 230 according to an embodiment may be disposed between a third rear region RA3 (or a third region) and a fourth rear region RA4 (or a fourth region) of the display unit 100 and may movably support each of the first arc member 211 and the second arc member 213.

In the display unit 100, the third rear region RA3 may be a right region of the rear surface of the display unit 100 with respect to a horizontal center line HCL of the display unit 100 parallel to the second direction Y. The fourth rear region RA4 may be a left region of the rear surface of the display unit 100 with respect to the horizontal center line HCL of the display unit 100. Here, the horizontal center line HCL of the display unit 100 may be disposed at a center portion of a long-side length (or a widthwise length) of the display unit 100.

The guider 230 according to an embodiment may include a first guide member 231 and a second guide member 233.

The first guide member 231 may be disposed in the third rear region RA3 of the display unit 100 and may movably support a first center portion of each of the first arc member 211 and the second arc member 213.

One side of the first guide member 231 may be fixed to the first rear region RA1 of the display unit 100, and the other side of the first guide member 231 may be fixed to the second rear region RA2 of the display unit 100. For example, the one side of the first guide member 231 may be fixed to the first rear region RA1 of the back cover 120 by a coupling member such as a screw or a bolt, and the other side of the first guide member 231 may be fixed to the second rear region RA2 of the back cover 120 by a coupling member such as a screw or a bolt.

A center portion between the one side and the other side of the first guide member 231 may be disposed in the third rear region RA3 of the back cover 120 to intersect with the first center portion of each of the first arc member 211 and the second arc member 213. The center portion of the first guide member 231 may be apart from the rear surface of the back cover 120 by a distance which is greater than a diameter of the arc member 210, with respect to a height of each of the one side and the other side of the first guide member 231. Accordingly, the first center portion of each of the first arc member 211 and the second arc member 213 may move in a separation space between the center portion of the first guide member 231 and the rear surface of the back cover 120.

The second guide member 233 may be disposed in the fourth rear region RA4 of the display unit 100 and may movably support a second center portion of each of the first arc member 211 and the second arc member 213.

One side of the second guide member 233 may be fixed to the first rear region RA1 of the display unit 100, and the other side of the second guide member 233 may be fixed to the second rear region RA2 of the display unit 100. For example, the one side of the second guide member 233 may be fixed to the first rear region RA1 of the back cover 120 by a coupling member such as a screw or a bolt, and the other side of the second guide member 233 may be fixed to the second rear region RA2 of the back cover 120 by a coupling member such as a screw or a bolt.

A center portion between the one side and the other side of the second guide member 233 may be disposed in the fourth rear region RA4 of the back cover 120 to intersect with the second center portion of each of the first arc member 211 and the second arc member 213. The center portion of the second guide member 233 may be apart from the rear surface of the back cover 120 by a distance which is greater than the diameter of the arc member 210, with respect to a height of each of the one side and the other side of the second guide member 233. Accordingly, the first center portion of each of the first arc member 211 and the second arc member 213 may move in a separation space between the center portion of the second guide member 233 and the rear surface of the back cover 120.

The curvature variation unit 200 according to an embodiment may further include a fixing bracket 240.

The fixing bracket 240 may be disposed in each of the third rear region RA3 and the fourth rear region RA4 of the display unit 100 and may movably support an end of each of the first arc member 211 and the second arc member 213. The fixing bracket 240 may movably support the end of each of the first arc member 211 and the second arc member 213 and may guide the movement of the end of each of the first arc member 211 and the second arc member 213. To this end, the fixing bracket 240 may include a side groove (or a side pocket portion) having a certain depth from an inner surface thereof so that the end of each of the first arc member 211 and the second arc member 213 is movably inserted into the side groove. For example, the fixing bracket 240 may be fixed adjacent to each of corner portions of the back cover 120, in the third rear region RA3 and the fourth rear region RA4 of the display unit 100. When each of the first arc member 211 and the second arc member 213 is rotating, the fixing bracket 240 may transfer pressure, generated at the end of each of the first arc member 211 and the second arc member 213, to each of a third rear edge portion and a fourth rear edge portion of the display unit 100. In this case, the fixing bracket 240 may allow the end of each of the first arc member 211 and the second arc member 213 to surface-contact the display unit 100, and thus, may prevent the local damage of the display unit 100 caused by a local point-contact between the end of each of the first arc member 211 and the second arc member 213 and the display unit 100.

The fixing bracket 240 according to an embodiment may include first to fourth fixing brackets 241 to 244.

The first fixing bracket 241 may be disposed in an upper region of the third rear region RA3 of the display unit 100 and may movably support the one end (or the first end) of the first arc member 211. For example, the first fixing bracket 241 may be fixed to the third rear region RA3 adjacent to a right upper corner portion of the back cover 120.

The second fixing bracket 242 may be disposed in an upper region of the fourth rear region RA4 of the display unit 100 and may movably support the other end (or the second end) of the first arc member 211. For example, the second fixing bracket 242 may be fixed to the fourth rear region RA4 adjacent to a left upper corner portion of the back cover 120.

The third fixing bracket 243 may be disposed in a lower region of the third rear region RA3 of the display unit 100 and may movably support the one end (or the first end) of the second arc member 213. For example, the third fixing bracket 243 may be disposed in parallel with the first fixing bracket 241 and may be fixed to the third rear region RA3 adjacent to a right lower corner portion of the back cover 120.

The fourth fixing bracket 244 may be disposed in a lower region of the fourth rear region RA4 of the display unit 100 and may movably support the other end (or the second end) of the second arc member 213. For example, the fourth fixing bracket 244 may be disposed in parallel with the second fixing bracket 242 and may be fixed to the fourth rear region RA4 adjacent to a left lower corner portion of the back cover 120.

The stand 300 may be disposed on the rear surface of the display unit 100 and may support the display unit 100 in an upright state. For example, the stand 300 may be supported by a plurality of stand supporting blocks 301 and 303 disposed in the curvature variation unit 200.

The stand 300 according to an embodiment may include a prop 310 and a post 330.

The prop 310 may be implemented to have a certain size. The prop 310 may include a curvature variation button part CVB and a curvature variation control circuit which controls the driver 220 of the curvature variation unit 200 on the basis of manipulation of a user performed through the curvature variation button part CVB.

The post 330 may be disposed vertical to the prop 310 and may be coupled to the stand supporting blocks 301 and 303 disposed in the curvature variation unit 200. Accordingly, the display unit 100 may be supported or mounted on the post 330 of the stand 300 in an upright state.

The display apparatus according to an embodiment of the present disclosure may further include a speaker unit 350 embedded into the stand 300. The speaker unit 350 according to an embodiment may be a woofer speaker, but is not limited thereto.

The display apparatus according to an embodiment of the present disclosure may further include a rear curtain unit 400.

Referring to FIGS. 3 to 5, the rear curtain unit 400 may be implemented on the rear surface of the display unit 100 to cover the curvature variation unit 200. The rear curtain unit 400 may implement a rear structure of the display apparatus. The rear curtain unit 400 may be deformed to correspond to a curvature variation of the display unit 100 based on driving of the curvature variation unit 200.

The rear curtain unit 400 according to an embodiment may include a curtain edge frame 410, a curtain rear frame 430, and a plurality of curtain members 450.

The curtain edge frame 410 may be connected to a rear edge portion of the display unit 100 and may include a first opening portion. For example, the curtain edge frame 410 may be implemented as a picture frame type to include the first opening portion which overlaps a rear surface, other than the rear edge portion of the display unit 100, of the display unit 100. The curtain edge frame 410 may be fixed to a rear edge portion of the back cover 120 by a coupling member such as a screw or a bolt.

The curtain rear frame 430 may be coupled to the curtain edge frame 410 and may include a second opening portion overlapping with the first opening portion. For example, the curtain rear frame 430 may be implemented as a picture frame type including the second opening portion overlapping with the first opening portion of the curtain edge frame 410. The curtain rear frame 430 may be fixed to the curtain edge frame 410 by a coupling member such as a screw or a bolt.

A plurality of curtain members 450 may be fixed to the curtain rear frame 430 so as to be apart from one another in the first direction X in parallel with the second direction Y. The plurality of curtain members 450 may be disposed in the second opening portion of the curtain rear frame 430 so as to be apart from one another in the first direction X in parallel with the second direction Y. For example, each of the plurality of curtain members 450 may be disposed in the second opening portion of the curtain rear frame 430 to have a certain tension and may be inclined at a certain angle to correspond to a curvature variation of the display unit 100. Each of the plurality of curtain members 450 according to an embodiment may include a fiber material or a fabric material, which is deformable to correspond to the curvature variation of the display unit 100.

The rear curtain unit 400 according to an embodiment may further include a stand connection port 470. The stand connection port 470 may be implemented by removing a center portion of each of the plurality of curtain members 450, and thus, may expose a rear center portion of the display unit 100 in a rearward direction RD with respect to the display apparatus.

The display apparatus according to an embodiment of the present disclosure may further include a vibration unit 500.

Referring to FIGS. 4 to 7, the vibration unit 500 may be disposed on the rear surface of the display unit 100 and may be implemented to vibrate the display panel 110 so that a sound is output based on a vibration of the display panel 110. For example, the vibration unit 500 may vibrate a first vibration region (or the third rear region RA3) and a second vibration region (or the fourth rear region RA4) of the display unit 100, and thus, may output a first sound (or a left sound) and a second sound (or a right sound), respectively generated based on vibrations of the first vibration region and the second vibration region, in a forward direction FD with respect to the display apparatus, thereby realizing a stereo sound.

The vibration unit 500 may be supported by the back cover 120 of the display unit 100 and may be connected to the rear surface of the display panel 110 through the back cover 120. To this end, the back cover 120 may include a through hole 121 into which the vibration unit 500 may be inserted.

The vibration unit 500 according to an embodiment may include first and second vibration units 510 and 530.

The first vibration unit 510 may vibrate the first vibration region RA3 of the display unit 100 to output the first sound (or the left sound), generated by the first vibration region of the display unit 100, in the forward direction FD with respect to the display unit 100. For example, the first vibration unit 510 may be supported by the back cover 120 and may be connected to the rear surface of the display panel 110 through the through hole 121 provided in the back cover 120.

The second vibration unit 530 may vibrate the second vibration region RA4 of the display unit 100 to output the second sound (or the right sound), generated by the second vibration region of the display unit 100, in the forward direction FD with respect to the display unit 100. For example, the second vibration unit 530 may be supported by the back cover 120 and may be connected to the rear surface of the display panel 110 through the through hole 121 provided in the back cover 120.

Each of the first vibration unit 510 and the second vibration unit 530 may include first and second sound generating units 511 and 513 which are disposed in the display unit 100 in parallel.

The first and second sound generating units 511 and 513 may be supported by the back cover 120 of the display unit 100 in parallel, and moreover, may pass through first and second through holes 121a and 121b of the through hole 121 provided in the back cover 120 and may be connected to the rear surface of the display panel 110.

The first sound generating unit 511 of the first vibration unit 510 may pass through the first through hole 121a provided in the back cover 120 overlapping the first vibration region RA3 of the display unit 100, and thus, may be connected to the first vibration region RA3 of the display panel 110 and may be coupled to the rear surface of the back cover 120 near the first through hole 121a.

The second sound generating unit 513 of the first vibration unit 510 may pass through the second through hole 121b provided in the back cover 120 overlapping the first vibration region RA3 of the display unit 100, and thus, may be connected to the first vibration region RA3 of the display panel 110 and may be coupled to the rear surface of the back cover 120 near the second through hole 121b.

The first sound generating unit 511 of the second vibration unit 530 may pass through the first through hole 121a provided in the back cover 120 overlapping the second vibration region RA4 of the display unit 100, and thus, may be connected to the second vibration region RA4 of the display panel 110 and may be coupled to the rear surface of the back cover 120 near the first through hole 121a.

The second sound generating unit 513 of the second vibration unit 530 may pass through the second through hole 121b provided in the back cover 120 overlapping the second vibration region RA4 of the display unit 100, and thus, may be connected to the second vibration region RA4 of the display panel 110 and may be coupled to the rear surface of the back cover 120 near the second through hole 121b.

Each of the first and second sound generating units 511 and 513 of each of the first vibration unit 510 and the second vibration unit 530 according to an embodiment may include a base frame 501, a magnet 502, a bobbin 503, a coil 504, a center pole 505, and a damper 506.

The base frame 501 may be referred to as a fixing part fixed to the back cover 120, and each of the magnet 502, the bobbin 503, the coil 504, the center pole 505, and the damper 506 may be referred to as a vibration part for vibrating the display panel 110. However, the present embodiment is not limited thereto.

The base frame 501 according to an embodiment may include a frame body 501a, an upper plate 501b, and a protrusion bracket 501c.

The frame body 501a may be fixed to the back cover 120. The frame body 501a may act as a lower plate which supports the magnet 502.

The upper plate 501b may protrude to a front edge portion of the frame body 501a to have a cylindrical shape including a hollow portion. Therefore, the frame body 501a and the upper plate 501b may be provided as one body having a U-shape. For example, the frame body 501a and the upper plate 501b are not limited to the terms and may each be referred to as another term such as a yoke.

The protrusion bracket 501c may protrude from a side surface of the upper plate 501b. The protrusion bracket 501c may be fixed to the rear surface of the back cover 120 by a fastening member 515, and thus, the base frame 501 may be fixed to the back cover 120.

The fastening member 515 may be a screw or a bolt which passes through the protrusion bracket 501c and is fastened to the rear surface of the back cover 120. In this case, a buffering member 600 may be disposed between the rear surface of the back cover 120 and the protrusion bracket 501c.

When a curvature of the display panel 110 varies, the buffering member 600 may tilt the base frame 501 on the basis of the curvature of the display panel 110 to maintain a contact state between the first and second sound generating units 511 and 513 and the display panel 110. For example, the buffering member 600 may include an elastic spring or an elastic pad, but is not limited thereto.

The magnet 502, the bobbin 503, and the coil 504 may each be referred to as a magnetic circuit unit or a magnetic vibration unit, which is disposed on the base frame 501 to vibrate the display panel 110.

The magnetic circuit unit according to an embodiment may have a dynamic type structure or an external magnetic type structure, which includes a magnet 502 disposed outside the coil 504, or may have a micro type structure or an internal magnetic type structure, which includes a magnet 502 disposed in the coil 504. Each of the first and second sound generating units 511 and 513 including the magnetic circuit unit having the internal type structure may be low in leakage magnetic flux and totally small in size. Each of the first and second sound generating units 511 and 513 according to the present disclosure may have the external magnetic type structure or the internal magnetic type structure. Hereinafter, an example where each of the first and second sound generating units 511 and 513 according to the present disclosure has the internal magnetic type structure will be described.

The magnet 502 may be disposed in a groove portion of the base frame 501. The magnet 502 may be a permanent magnet having a cylindrical shape so as to be inserted into the bobbin 503.

The bobbin 503 may be disposed on the base frame 501 to surround the magnet 502 and may be coupled to the rear surface of the display panel 110. The bobbin 503 according to an embodiment may have a circular shape or an elliptical (or oval shape), but is not limited thereto. The bobbin 503 having the oval shape may have an elliptical shape, a corners-rounded rectangular shape, or a non-circular curved shape having a width different from its height, but embodiments of the present disclosure are not limited thereto. For example, in the bobbin 503 having the oval shape, a ratio of a long-axis diameter and a short-axis diameter may be 1.3:1 to 2:1. The bobbin 503 having the oval shape may more improve a sound of the high-pitched sound band than the circular shape and may reduce heat caused by a vibration, and thus, the bobbin 503 having the oval shape may have a good heat dissipation characteristic.

The coil 504 may be wound to surround an outer circumference surface of the bobbin 503 and may be supplied with a current of a driving signal (or a voice current) from the outside. The coil 504 may be referred to as a voice coil, but the term is not limited thereto. When a current (or a sound signal) is applied to the coil 504, a whole portion of the bobbin 503 may vibrate, for example, may perform a vertical reciprocating motion, according to Fleming's left hand rule based on an application magnetic field generated around the coil 504 and an external magnetic field generated around the magnet 502, and a sound (or a panel vibration sound) may be generated based on a vibration of the display panel 110 performed by the vertical movement (or vibration) of the bobbin 503 and may be output in the forward direction FD with respect to the display unit 100.

The center pole 505 may be disposed on the magnet 502 to guide a vibration of the bobbin 503. For example, the center pole 505 may be inserted into the hollow portion of the bobbin 503 and may be surrounded by the bobbin 503. For example, the center pole 505 may be referred to as an elevation guider or pole pieces, but is not limited thereto.

The damper 506 may be disposed between the base frame 501 and the bobbin 503. For example, the damper 506 according to an embodiment may be disposed between an upper outer circumference surface of the bobbin 503 and a protrusion frame which protrudes from the frame body 501a of the base frame 501 to surround the upper plate 501b. The damper 506 may be provided in a creased structure which is creased between one end and the other end thereof and may be contracted and relaxed based on a vibration of the bobbin 503. A vibration distance (or a vertical movement distance) of the bobbin 503 may be limited by a restoring force of the damper 506. For example, when the bobbin 503 vibrates by a certain distance or more or vibrates by a certain distance or less, the bobbin 503 may be restored to an original position by the restoring force of the damper 506. Also, the damper 506 may be referred to as a spider, a suspension, or an edge, but is not limited thereto.

Each of the first and second sound generating units 511 and 513 according to an embodiment may further include a bobbin protection member 507 disposed on the bobbin 503. For example, the bobbin protection member 507 may be referred to as a bobbin ring or a bobbin cap, but is not limited thereto.

The bobbin protection member 507 may be disposed on a front surface (or a front end portion) of the bobbin 503 and may transfer a raising and lowering motion (or vibration) of the bobbin 503 to the rear surface of the display panel 110. The bobbin protection member 507 according to an embodiment may have a ring shape disposed on the front surface of the bobbin 503, a disc shape covering the whole front surface of the bobbin 503, or a cap shape surrounding the front surface and an upper outer surface of the bobbin 503, but the shape is not limited thereto.

The bobbin protection member 507 may be disposed on (or coupled to) the rear surface of the display panel 110 by using a first adhesive member. The first adhesive member may be disposed between the rear surface of the display panel 110 and the bobbin protection member 507. The first adhesive member according to an embodiment may include an adhesive or a double-sided tape, but is not limited thereto.

The bobbin protection member 507 according to an embodiment may be provided in a molding form of an injection material or metal. For example, the bobbin protection member 507 may include a textile reinforced material, a composite resin including a textile reinforced material, or metal, and in this case, may have a heat dissipation function of dissipating heat occurring when the first and second sound generating units 511 and 513 are being driven.

Figure 8:
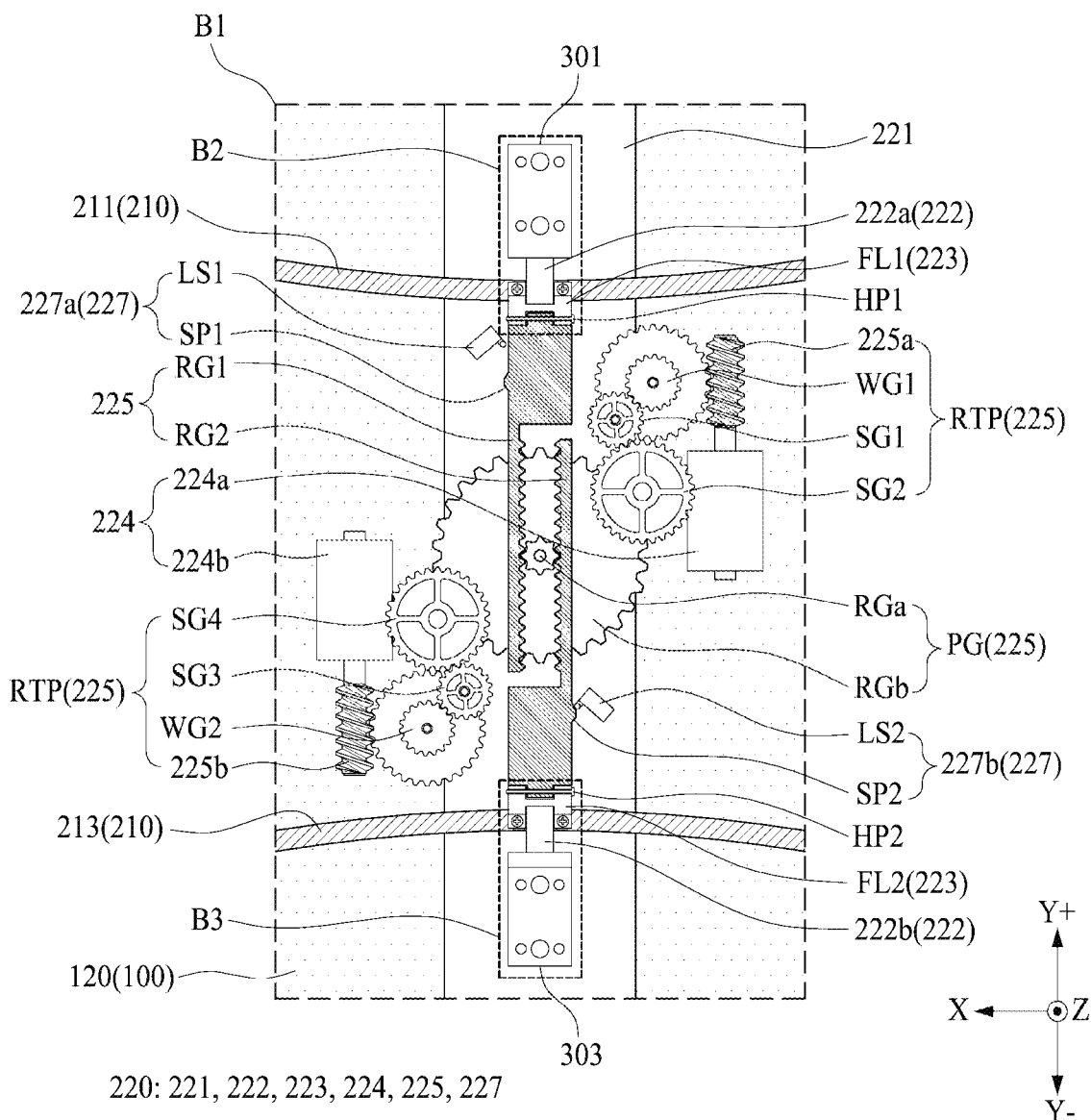
FIG. 8 is an enlarged view of a region 'B1' illustrated in FIG. 6.
Figure 9:
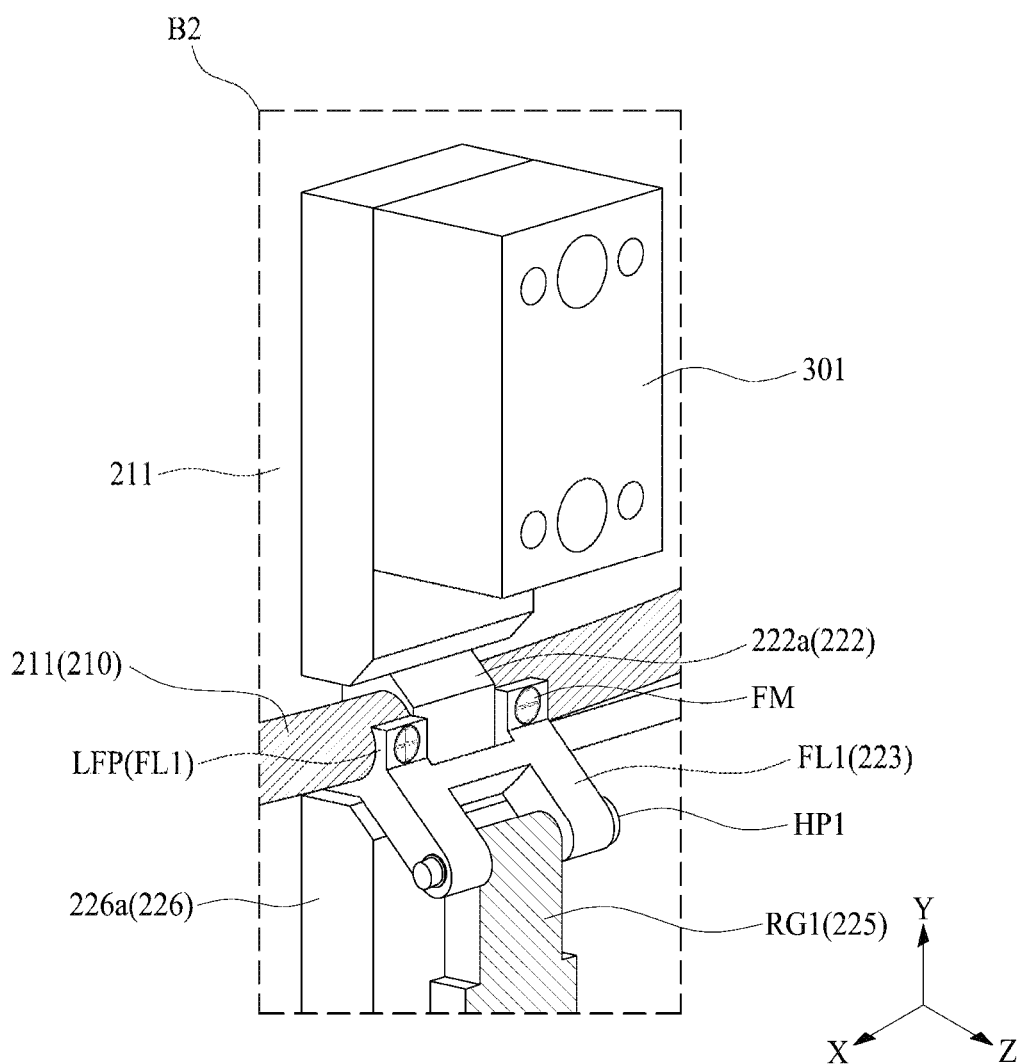
FIG. 9 is an enlarged view of a region 'B2' illustrated in FIG. 8.
Figure 10:
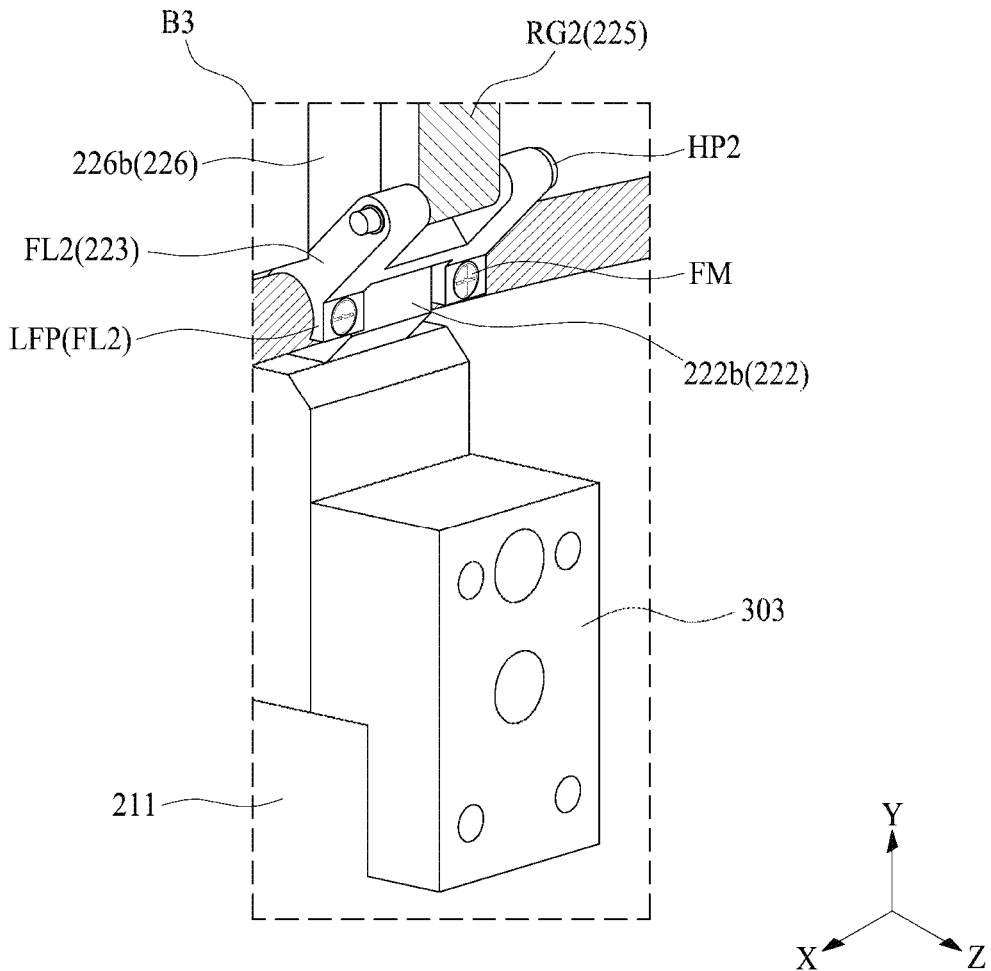
FIG. 10 is an enlarged view of a region 'B3' illustrated in FIG. 8.

FIG. 8 is an enlarged view of a region 'B1' illustrated in FIG. 6, FIG. 9 is an enlarged view of a region 'B2' illustrated in FIG. 8, and FIG. 10 is an enlarged view of a region 'B3' illustrated in FIG. 8. The drawings are diagrams for describing a driver of a curvature variation unit.

Referring to FIGS. 8 to 10, a driver 220 of a curvature variation unit 200 according to an embodiment of the present disclosure may include a supporting plate 221, a holder 222, a fixing link 223, at least one rotary motor 224, and a gear assembly 225.

The supporting plate 221 may be disposed to overlap a rear center portion of a display unit 100. For example, the supporting plate 221 may be implemented to have a certain width parallel to the first direction X and a certain length parallel to the second direction Y and may be disposed on (or coupled to) the rear surface of the back cover 120 to overlap a center portion (or a length center portion) of each of the first arc member 211 and the second arc member 213. The supporting plate 221 may support each of the holder 222, the at least one rotary motor 224, and the gear assembly 225.

The supporting plate 221 may include the stand supporting blocks 301 and 303 coupled to the stand 300. For example, the stand supporting blocks 301 and 303 may be respectively coupled to an upper portion and a lower portion of the supporting plate 221.

The holder 222 may be coupled to the supporting plate 221 and may rotatably support a center portion of the arc member 210. Therefore, the center portion of the arc member 210 may be rotatably disposed between the supporting plate 221 and the holder 222. Additionally, a driver 220 according to an embodiment may further include a bearing disposed between the center portion of the arc member 210 and the holder 222.

The holder 222 according to an embodiment may include a first holder 222a, which is coupled to the supporting plate 221 to rotatably support a center portion of a first arc member 211, and a second holder 222b which is coupled to the supporting plate 221 to rotatably support a center portion of a second arc member 213.

Both ends of each of the first holder 222a and the second holder 222b according to an embodiment may be coupled to the supporting plate 221 by a coupling member such as a screw or a bolt.

The driver 220 according to an embodiment may further include a first bearing disposed between the center portion of the first arc member 211 and the first holder 222a and a second bearing disposed between the center portion of the second arc member 213 and the second holder 222b.

A fixing link 223 may be fixed to the center portion of the arc member 210. For example, the fixing link 223 may be fixed to the center portion of the arc member 210 by a fixing member FM such as a screw or a bolt.

The fixing link 223 according to an embodiment may include a first fixing link FL1 fixed to the center portion of the first arc member 211 and a second fixing link FL2 fixed to the center portion of the second arc member 213.

Each of the first fixing link FL1 and the second fixing link FL2 may include a pair of link fixing parts LFP which protrude in parallel with the first and second holders 222a and 222b therebetween. For example, the first fixing link FL1 may include a pair of link fixing parts LFP which protrude in parallel with the first holder 222a therebetween. The second fixing link FL2 may include a pair of link fixing parts LFP which protrude in parallel with the second holder 222b therebetween. The pair of link fixing parts LFP may be respectively fixed to the center portions of corresponding arc members 211 and 213 by the fixing member FM.

Figure 11:
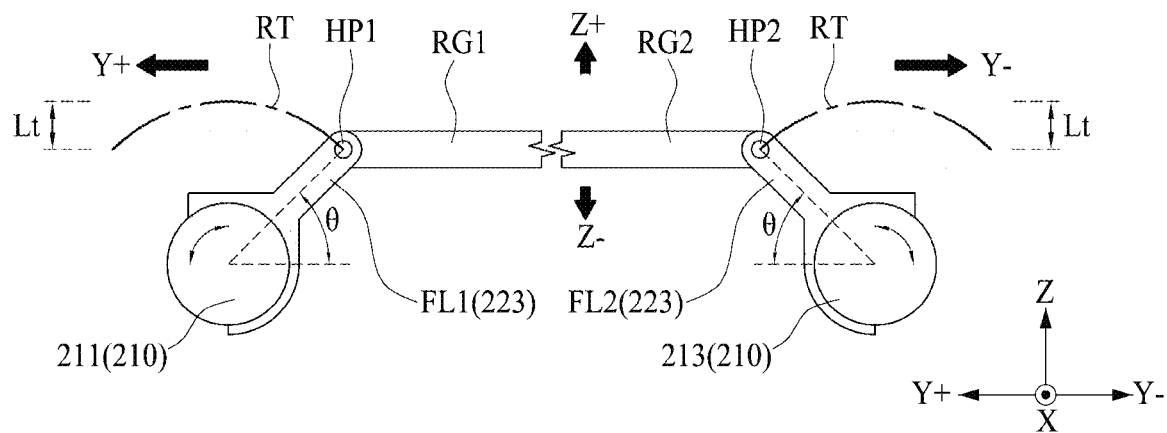
FIG. 11 is a diagram for describing a fixed link illustrated in FIGS. 8 to 10.

The first fixing link FL1, as illustrated in FIG. 11, may be disposed on an inner surface of the first arc member 211 facing a rear center region of the display unit 100 and may be disposed to be inclined by a certain angle (θ) with respect to the second direction Y. The first fixing link FL1 may be inclined by a certain angle (θ) from a rear surface of the display unit 100. For example, the first fixing link FL1 may be clockwise inclined by 45 degrees from a vertical line which extends in a thickness direction Z of the display unit 100 from a center axis of the first arc member 211. In this case, an included angle between the rear surface of the display unit 100 and an extension line connecting a center axis of the first fixing link FL1 to the center axis of the first arc member 211 may be about 45 degrees.

The second fixing link FL2, as illustrated in FIG. 11, may be disposed on an inner surface of the second arc member 213 facing a rear center region of the display unit 100 and may be disposed to be inclined by a certain angle (θ) with respect to the second direction Y. The second fixing link FL2 may be inclined by a certain angle (θ) from the rear surface of the display unit 100. For example, the second fixing link FL2 may be counterclockwise inclined by 45 degrees from a vertical line which extends in the thickness direction Z of the display unit 100 from a center axis of the second arc member 213. In this case, an included angle between the rear surface of the display unit 100 and an extension line connecting a center axis of the second fixing link FL2 to the center axis of the second arc member 213 may be about 45 degrees.

Referring to FIG. 8, the at least one rotary motor 224 may be disposed in the rear center region of the display unit 100 and may be supported by the supporting plate 221. The at least one rotary motor 224 may provide a rotational force to the gear assembly 225 in response to manipulation of a user performed for varying a curvature of the display unit 100.

The driver 220 according to the present embodiment may include first and second rotary motors 224a and 224b (or a pair of rotary motors), for maintaining balance, decreasing noise, and securing a driving force (or rotational force) margin.

The first and second rotary motors 224a and 224b may be disposed in parallel with each other with the gear assembly 225 therebetween. A driving shaft (or a rotational shaft) of the first rotary motor 224a may be disposed adjacent to the first arc member 211, and a driving shaft (or a rotational shaft) of the second rotary motor 224b may be disposed adjacent to the second arc member 213. In this case, the first and second rotary motors 224a and 224b may rotate in the same direction.

Referring to FIGS. 8 to 11, the gear assembly 225 may be disposed on the supporting plate 221 and may be connected to the rotary motor 224. The gear assembly 225 may rotate the fixing link 223 on the basis of a rotational motion of the rotary motor 224 and may rotate the arc member 210 at a fixed position on the basis of a rotation of the fixing link 223. For example, the gear assembly 225 may rotate the first fixing link FL1 and the second fixing link FL2 of the fixing link 223 in opposite directions on the basis of the rotational motion of the rotary motor 224, and thus, may simultaneously rotate each of the first fixing link FL1 and the second fixing link FL2 at a fixed position. The gear assembly 225 may be referred to as a reduction gear part, but is not limited thereto.

The gear assembly 225 according to an embodiment may include a first rack gear RG1, a second rack gear RG2, a pinion gear PG, and a rotation transfer part RTP.

The first rack gear RG1 may be rotatably connected to the first fixing link FL1 and may rotate the first fixing link FL1 by a maximum of 90 degrees in a first rotational direction or may rotate the first fixing link FL1 by a maximum of 90 degrees in a second rotational direction, based on a rectilinear motion performed in the second direction Y.

One end of the first rack gear RG1 may be rotatably connected to the first fixing link FL1 by using a first hinge pin HP1. The first fixing link FL1 may be rotatably connected to the one end of the first rack gear RG1 by using the first hinge pin HP1. Therefore, the first fixing link FL1 may rotate based on a rectilinear motion of the first rack gear RG1 to rotate the first arc member 211. In this case, the first rack gear RG1 may move in the thickness direction Z of the display unit 100 on the basis of a rotation trajectory RT of the first fixing link FL1. For example, the first rack gear RG1 may be raised (Z+) or lowered (Z−) by a distance Lt corresponding to the rotation trajectory RT of the first fixing link FL1 in the thickness direction Z of the display unit 100 while performing a rectilinear motion in the second direction Z.

The second rack gear RG2 may be rotatably connected to the second fixing link FL2 and may rotate the second fixing link FL2 by a maximum of 90 degrees in the first rotational direction or may rotate the second fixing link FL2 by a maximum of 90 degrees in the second rotational direction, based on a rectilinear motion performed in the second direction Y.

One end of the second rack gear RG2 may be rotatably connected to the second fixing link FL2 by using a second hinge pin HP2. The second fixing link FL2 may be rotatably connected to the one end of the second rack gear RG2 by using the second hinge pin HP2. Therefore, the second fixing link FL2 may rotate based on a rectilinear motion of the second rack gear RG2 to rotate the second arc member 213. In this case, the second rack gear RG2 may move in the thickness direction Z of the display unit 100 on the basis of a rotation trajectory RT of the second fixing link FL2. For example, the second rack gear RG2 may be raised (Z+) or lowered (Z−) by a distance Lt corresponding to the rotation trajectory RT of the second fixing link FL2 in the thickness direction Z of the display unit 100 while performing a rectilinear motion in the second direction Z.

The pinion gear PG may be connected (or engaged) between the first rack gear RG1 and the second rack gear RG2. The pinion gear PG may allow the first rack gear RG1 and the second rack gear RG2 to perform a rectilinear motion in opposite directions on the basis of a rotational motion. For example, the pinion gear PG may rotate in the first rotational direction to allow the first rack gear RG1 to perform a rectilinear motion in a first rectilinear direction Y+ parallel to the second direction Y and to allow the second rack gear RG2 to perform a rectilinear motion in a second rectilinear direction Y− opposite to the first rectilinear direction Y+. On the other hand, the pinion gear PG may rotate in the second rotational direction opposite to the first rotational direction to allow the first rack gear RG1 to perform a rectilinear motion in the second rectilinear direction Y− and to allow the second rack gear RG2 to perform a rectilinear motion in the first rectilinear direction Y+.

The pinion gear PG according to an embodiment may be implemented so that the rack gears RG1 and RG2 are raised (Z+) or lowered (Z−) based on the rotation trajectory RT of each of the fixing links FL1 and FL2 which rotate based on the rectilinear motions of the rack gears RG1 and RG2. For example, a gear height (or a tooth height) of the pinion gear PG may be implemented to exceed a maximum elevation height (or distance) of each of the rack gears RG1 and RG2 based on the rotation trajectory RT of each of the fixing links FL1 and FL2.

The pinion gear PG according to an embodiment may include a double gear structure which includes a first rotation gear RGa having a first size and a second rotation gear RGb having a second size which is greater than the first size. For example, the first rack gear RG1 and the second rack gear RG2 may be disposed on the second rotation gear RGb. The first rotation gear RGa may be connected (or engaged) between the first rack gear RG1 and the second rack gear RG2. Also, a gear height (or a tooth height) of the first rotation gear RGa may be implemented to exceed a maximum elevation height (or distance) of each of the rack gears RG1 and RG2 based on the rotation trajectory RT of each of the fixing links FL1 and FL2.

The rotation transfer part RTP may transfer a rotational motion of the rotary motor 224 to the pinion gear PG. The rotation transfer part RTP may reduce a rotation speed of the rotary motor 224 to rotate the pinion gear PG. For example, the rotation transfer part RTP may transfer a rotation, performed in the first rotational direction, of the first rotary motor 224a to the pinion gear PG, and thus, may rotate the pinion gear PG in the first rotational direction. On the other hand, the rotation transfer part RTP may transfer a rotation, performed in the second rotational direction, of the first rotary motor 224a to the pinion gear PG, and thus, may rotate the pinion gear PG in the second rotational direction.

The rotation transfer part RTP according to an embodiment may include a first worm 225a, a first worm gear WG1, a first spur gear SG1, and a second spur gear SG2.

The first worm 225a may be connected to a driving shaft of the first rotary motor 224a. The first worm 225a may rotate in the first rotational direction on the basis of a rotation of the first rotary motor 224a performed in the first rotational direction, or may rotate in the second rotational direction on the basis of a rotation of the first rotary motor 224a performed in the second rotational direction.

The first worm gear WG1 may be connected (or engaged) to the first worm 225a and may rotate based on a rotational motion of the first worm 225a. For example, the first worm gear WG1 may rotate by one gear when the first worm 225a rotates once. A rotational-shaft direction of the first worm gear WG1 may be perpendicular to a rotational-shaft direction of the first worm 225a. For example, the rotational-shaft direction of the first worm 225a may be parallel to the second direction Y, and the rotational-shaft direction of the first worm gear WG1 may be parallel to the thickness direction Z of the back cover 120.

The first worm gear WG1 according to an embodiment may include a double gear structure which includes a lower worm gear having a first size and an upper worm gear having a second size which is less than the first size. For example, in the first worm gear WG1 having the double gear structure, the lower worm gear may be connected (or engaged) to the first worm 225a, and the upper worm gear may be connected (or engaged) to the first spur gear SG1.

The first spur gear SG1 may be connected (or engaged) to the first worm gear WG1 and may perform a rotational motion in a direction opposite to a rotational-motion direction of the first worm gear WG1. For example, the first spur gear SG1 may be connected (or engaged) between the upper worm gear of the first worm gear WG1 and the second spur gear SG2.

The second spur gear SG2 may be connected (or engaged) to the first spur gear SG1 and may be connected (or engaged) to the pinion gear PG. The second spur gear SG2 may perform a rotational motion in a direction opposite to a rotational-motion direction of the first spur gear SG1 to allow the pinion gear PG to perform a rotational motion.

The second spur gear SG2 according to an embodiment may include a double gear structure which includes a lower spur gear having a first size and an upper spur gear having a second size which is greater than the first size. For example, in the second spur gear SG2 having the double gear structure, the lower spur gear may be connected (or engaged) to the second rotation gear RGb of the pinion gear PG, and the upper spur gear may be connected (or engaged) to the first spur gear SG1.

The rotation transfer part RTP may transfer a rotation, performed in the first rotational direction, of the second rotary motor 224b to the pinion gear PG, and thus, may rotate the pinion gear PG in the first rotational direction. On the other hand, the rotation transfer part RTP may transfer a rotation, performed in the second rotational direction, of the second rotary motor 224b to the pinion gear PG, and thus, may rotate the pinion gear PG in the second rotational direction. To this end, the rotation transfer part RTP according to an embodiment may include a second worm 225b, a second worm gear WG2, a third spur gear SG3, and a fourth spur gear SG4.

The second worm 225b may be connected to a driving shaft of the second rotary motor 224b. The second worm 225b may rotate in the first rotational direction on the basis of a rotation of the second rotary motor 224b performed in the first rotational direction, or may rotate in the second rotational direction on the basis of a rotation of the second rotary motor 224b performed in the second rotational direction.

The second worm gear WG2 may be connected (or engaged) to the second worm 225b and may rotate based on a rotational motion of the second worm 225b. For example, the second worm gear WG2 may rotate by one gear when the second worm 225b rotates once. A rotational-shaft direction of the second worm gear WG2 may be perpendicular to a rotational-shaft direction of the second worm 225b. For example, the rotational-shaft direction of the second worm 225b may be parallel to the second direction Y, and the rotational-shaft direction of the second worm gear WG2 may be parallel to the thickness direction Z of the back cover 120.

The second worm gear WG2 according to an embodiment may include a double gear structure which includes a lower worm gear having a first size and an upper worm gear having a second size which is less than the first size. For example, in the second worm gear WG2 having the double gear structure, the lower worm gear may be connected (or engaged) to the second worm 225b, and the upper worm gear may be connected (or engaged) to the third spur gear SG3.

The third spur gear SG3 may be connected (or engaged) to the second worm gear WG2 and may perform a rotational motion in a direction opposite to a rotational-motion direction of the second worm gear WG2. For example, the third spur gear SG3 may be connected (or engaged) between the upper worm gear of the second worm gear WG2 and the fourth spur gear SG4.

The fourth spur gear SG4 may be connected (or engaged) to the third spur gear SG3 and may be connected (or engaged) to the pinion gear PG. The fourth spur gear SG4 may perform a rotational motion in a direction opposite to a rotational-motion direction of the third spur gear SG3 to allow the pinion gear PG to perform a rotational motion.

The fourth spur gear SG4 according to an embodiment may include a double gear structure which includes a lower spur gear having a first size and an upper spur gear having a second size which is greater than the first size. For example, in the fourth spur gear SG4 having the double gear structure, the lower spur gear may be connected (or engaged) to the second rotation gear RGb of the pinion gear PG, and the upper spur gear may be connected (or engaged) to the third spur gear SG3.

The driver 220 of the curvature variation unit 200 according to an embodiment of the present disclosure may further include a guide rail 226.

The guide rail 226 may be disposed between the supporting plate 221 and the rack gears RG1 and RG2 and may guide a rectilinear motion of each of the rack gears RG1 and RG2.

The guide rail 226 according to an embodiment may include a first guide rail 226a disposed between the supporting plate 221 and the first rack gear RG1 and a second guide rail 226b disposed between the supporting plate 221 and the second rack gear RG2.

The first guide rail 226a may be disposed on the supporting plate 221 to include a guide groove. In this case, the first rack gear RG1 may include a sliding protrusion portion which is slidably inserted into the guide groove of the first guide rail 226a. Therefore, the first rack gear RG1 may perform a rectilinear motion on the first guide rail 226a on the basis of a rotation of the pinion gear PG.

The second guide rail 226b may be disposed on the supporting plate 221 to include a guide groove. In this case, the second rack gear RG2 may include a sliding protrusion portion which is slidably inserted into the guide groove of the second guide rail 226b. Therefore, the second rack gear RG2 may perform a rectilinear motion on the second guide rail 226b on the basis of a rotation of the pinion gear PG.

The driver 220 of the curvature variation unit 200 according to an embodiment of the present disclosure may further include a limit switch unit 227.

The limit switch unit 227 may be disposed on the supporting plate 221 so as to be adjacent to the rack gears RG1 and RG2 and may limit a maximum distance of a rectilinear motion of each of the rack gears RG1 and RG2. For example, the limit switch unit 227 may be implemented to limit the maximum distance of the rectilinear motion of each of the rack gears RG1 and RG2 on the basis of a physical contact with the rack gears RG1 and RG2.

The limit switch unit 227 according to an embodiment may include a first limit switch unit 227a and a second limit switch unit 227b. The first limit switch unit 227a may limit a maximum rectilinear motion distance of the first rack gear RG1 based on the first rectilinear direction Y+. The first limit switch unit 227a may limit a maximum rotational angle of the arc member 210, or may limit a maximum curvature of the display unit 100.

The first limit switch unit 227a according to an embodiment may include a first limit switch LS1 disposed at the supporting plate 221 so as to be adjacent to the first arc member 211 and a first stopper SP1 protruding from an outer surface of the first rack gear RG1. When the first limit switch LS1 physically contacts the first stopper SP1 disposed in the first rack gear RG1 which performs a rectilinear motion in the first rectilinear direction Y+, the first limit switch LS1 may generate a first limit signal and may provide the first limit signal to the curvature variation control circuit. The curvature variation control circuit may stop a rotation of the rotary motor 224 in response to the first limit signal provided from the first limit switch LS1.

The second limit switch unit 227b may limit a maximum rectilinear motion distance of the second rack gear RG2 based on the second rectilinear direction Y−.

The second limit switch unit 227b according to an embodiment may include a second limit switch LS2 disposed on the supporting plate 221 so as to be adjacent to the pinion gear PG and a second stopper SP2 protruding from an outer surface of the second rack gear RG2. When the second limit switch LS2 physically contacts the second stopper SP2 disposed in the second rack gear RG2 which performs a rectilinear motion in the first rectilinear direction Y+, the second limit switch LS2 may generate a second limit signal and may provide the second limit signal to the curvature variation control circuit. The curvature variation control circuit may stop a rotation of the rotary motor 224 in response to the second limit signal provided from the second limit switch LS2.

Figure 12A:
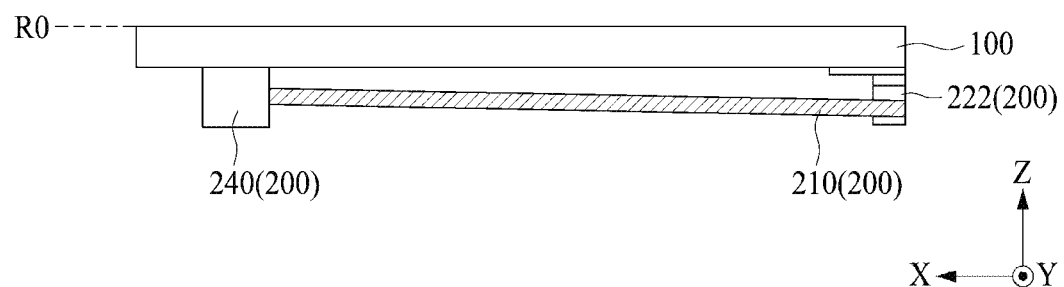
FIG. 12A is a cross-sectional view illustrating a flat shape of a display apparatus according to an embodiment of the present disclosure.
Figure 12B:
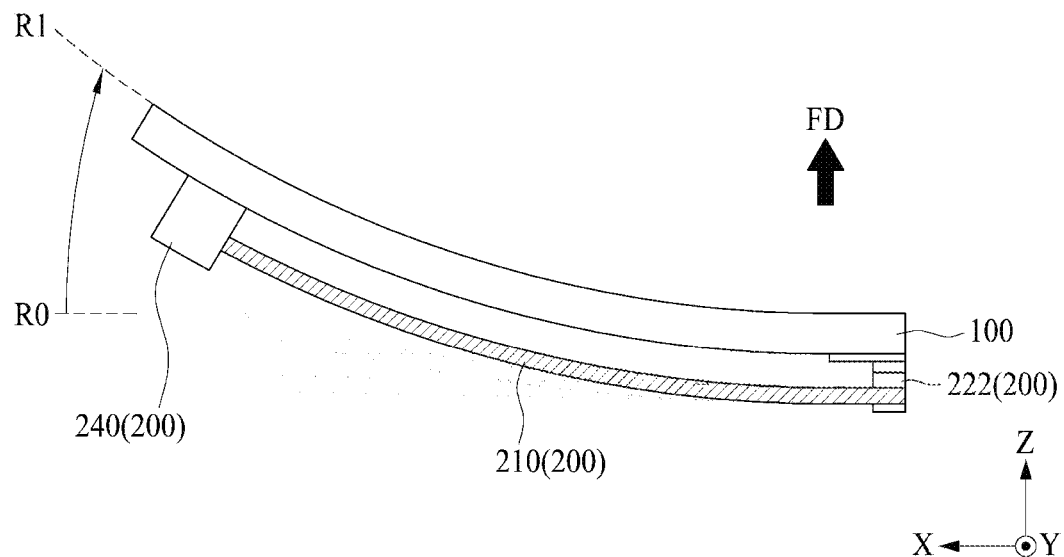
FIG. 12B is a cross-sectional view illustrating a curvature variation state of a display apparatus according to an embodiment of the present disclosure.

FIG. 12A is a cross-sectional view illustrating a flat shape of a display apparatus according to an embodiment of the present disclosure, and FIG. 12B is a cross-sectional view illustrating a curvature variation state of a display apparatus according to an embodiment of the present disclosure.

Referring to FIG. 12A, in a display apparatus according to the present disclosure, a display unit 100 may be disposed (or implemented) in a flat shape having a curvature R0 of 0 (zero). For example, as illustrated in FIG. 8, the rotary motor 224 of the curvature variation unit 200 may be in a state where a rotational motion stops based on the second limit signal of the second limit switch 227b.

In response to manipulation of a user, as illustrated in FIGS. 1, 2, and 12B, the display unit 100 having a flat shape may be disposed (or implemented) in a curved shape having a curvature R1 other than 0 (zero). For example, as illustrated in FIG. 8, the arc member 210 of the curvature variation unit 200 may rotate by a maximum of 90 degrees at a fixed position on the basis of a rotational motion of the rotary motor 224 based on manipulation of the user in a state which is laid in parallel with the rear surface of the display unit 100 and thus may stand in the thickness direction Z of the display unit 100, and moreover, pressure generated in an end of the arc member 210 standing through rotation may be applied to the display unit 100 through the fixing bracket 240, whereby both side portions of the display unit 100 may protrude in the forward direction FD with respect to a center portion of the display apparatus. As a result, the both side portions of the display unit 100 may protrude in the forward direction FD with respect to the center portion of the display apparatus on the basis of a rotational motion of the arc member 210 standing in the thickness direction Z of the display unit 100, and thus, the display unit 100 may vary in a curved shape having the curvature R1 other than 0 (zero). For example, as illustrated in FIG. 8, the rotary motor 224 of the curvature variation unit 200 which varies the display unit 100 to a curved shape may stop a rotational motion on the basis of the first limit signal of the first limit switch 227a.

On the other hand, as illustrated in FIG. 8, the arc member 210 of the curvature variation unit 200 may rotate by a maximum of 90 degrees at a fixed position on the basis of a rotational motion of the rotary motor 224 based on manipulation of the user in a state which stands in the thickness direction Z of the display unit 100, and thus, may be laid in parallel with the rear surface of the display unit 100, whereby the display unit 100 may be disposed (or implemented) in a flat shape having a curvature R0 of 0 (zero) one basis of an elastic restoring force.

Figure 13:
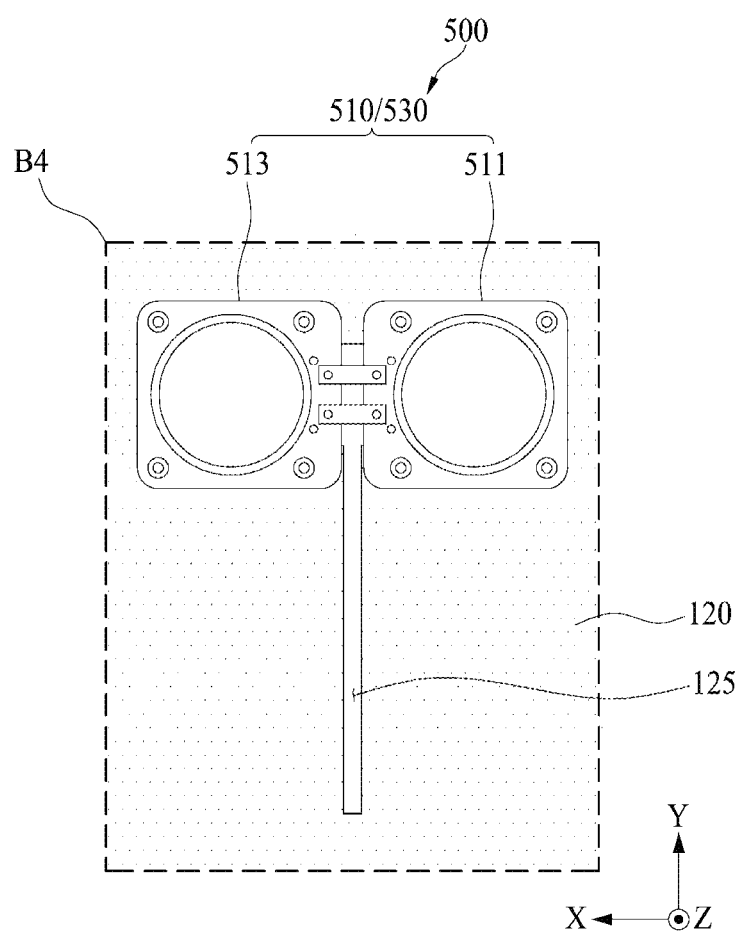
FIG. 13 is an enlarged view of a region 'B4' illustrated in FIG. 6.

FIG. 13 is an enlarged view of a region 'B4' illustrated in FIG. 6 and is a diagram for describing a slit according to the present disclosure.

Referring to FIGS. 6, 7, and 13, a display apparatus according to the present disclosure may further include a slit 125.

The slit 125 may be implemented so that stress applied to the vibration unit 500 is reduced when a curvature of the display unit 100 varies. Also, the slit 125 may be implemented to minimize the degradation in sound quality caused by a position-based air gap (AG) variation (or deviation) between the display panel 110 and the back cover 120 on the basis of a curvature of the display unit 100.

The slit 125 may be disposed in the back cover 120 overlapping the vibration unit 500. The slit 125 according to an embodiment may be implemented to pass through the back cover 120 overlapping a region between a pair of sound generating units 511 and 513.

The slit 125 may have a length parallel to the second direction Y. A length of the slit 125 may be longer than that of each of the sound generating units 511 and 513. One end of the slit 125 may be disposed between the pair of sound generating units 511 and 513.

The slit 125 may be formed to vertically pass through the back cover 120 in the thickness direction Z of the display unit 100 and may allow an air gap AG (or an internal air gap) between the display panel 110 and the back cover 120 to communicate with a rear outer portion (or an external air gap) of the back cover 120. The slit 125 may allow the air gap AG between the display panel 110 and the back cover 120 to communicate with the external air gap, and thus, when the display panel 110 is vibrating (or shaking), an air may smoothly flow between the internal air gap AG and the external air gap. Therefore, the display panel 110 may stably vibrate, and thus, a frequency characteristic and a sound pressure characteristic of a low-pitched sound band based on a vibration of the display panel 100 may increase. For example, a frequency of the low-pitched sound band may be 800 Hz or less, but is not limited thereto.

Figure 14:
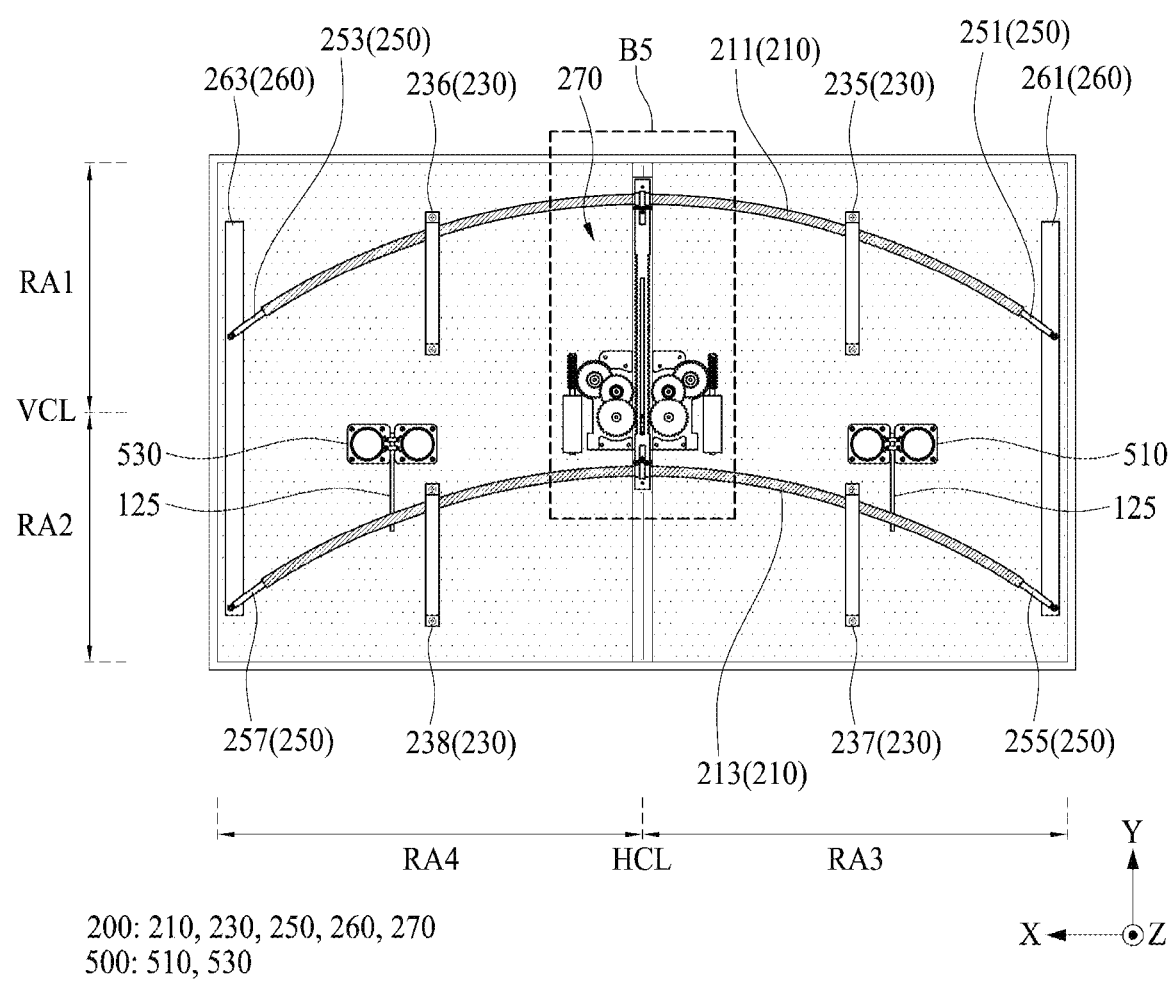
FIG. 14 is a diagram for describing a curvature variation unit according to another embodiment of the present disclosure.
Figure 15:
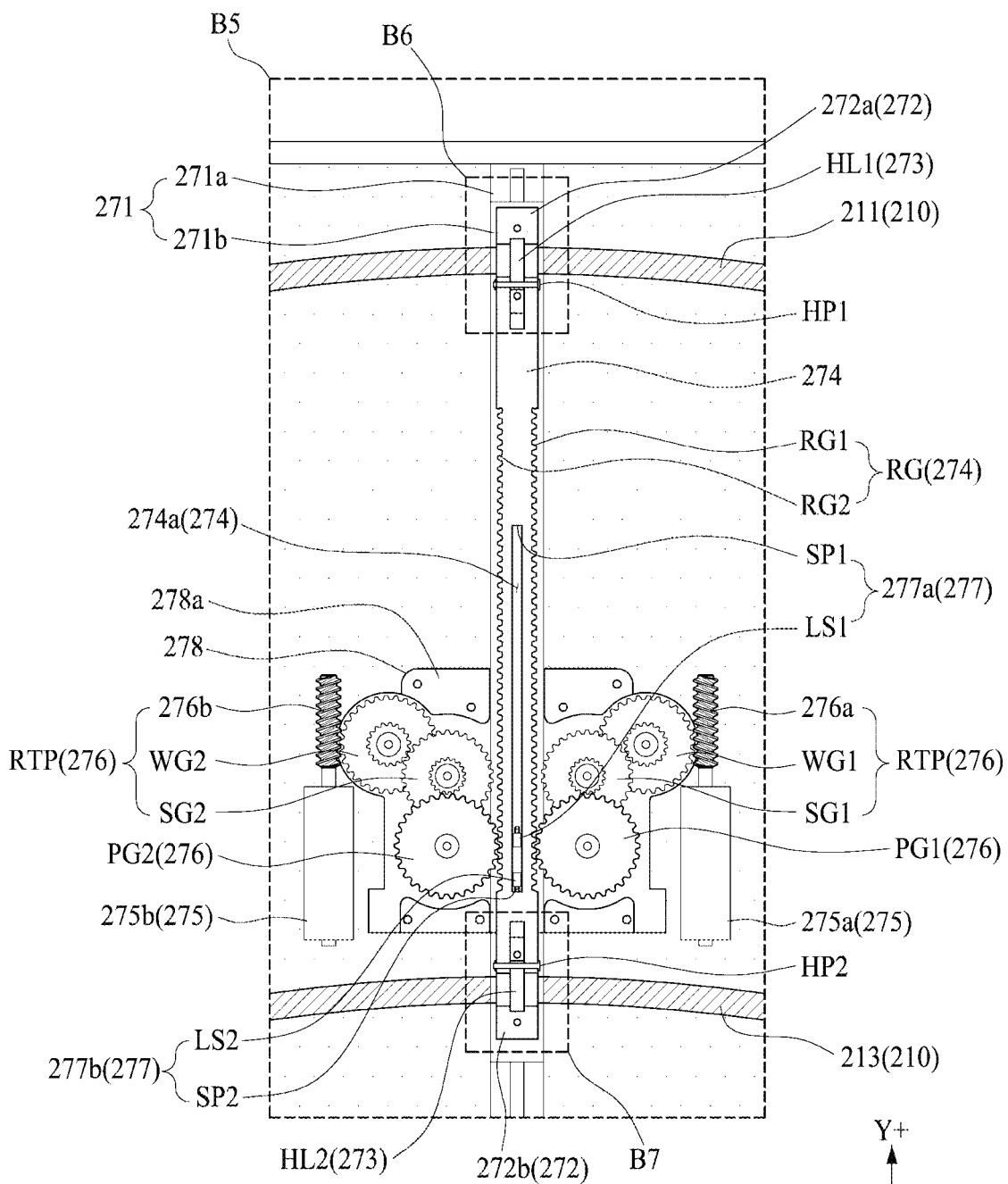
FIG. 15 is an enlarged view of a region 'B5' illustrated in FIG. 14.
Figure 16:
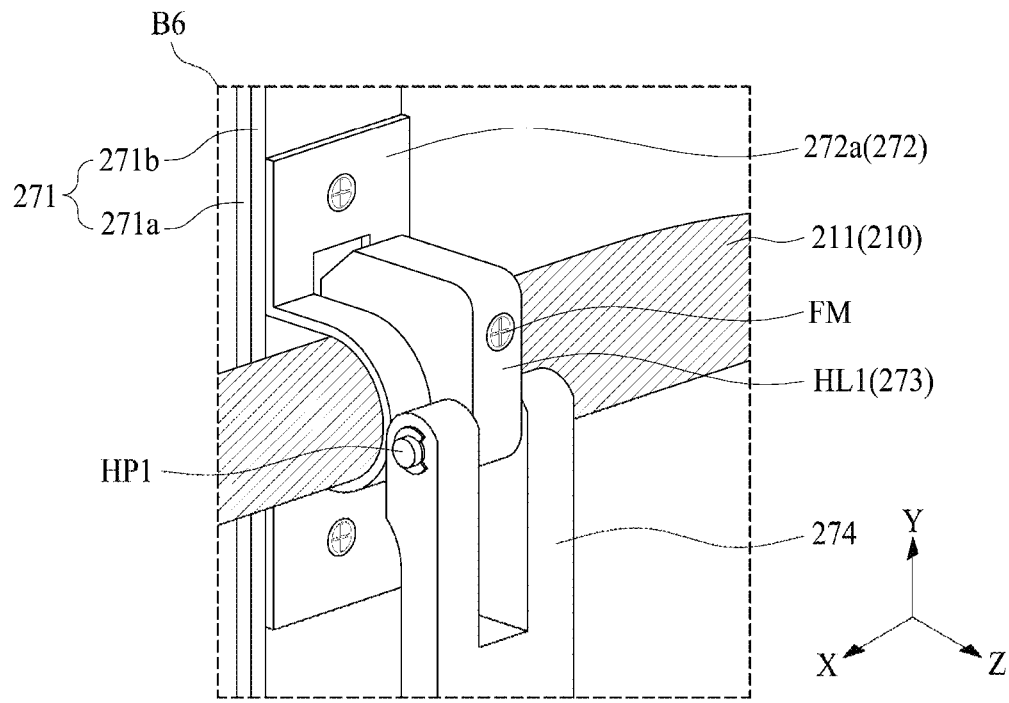
FIG. 16 is an enlarged view of a region 'B6' illustrated in FIG. 15.
Figure 17:
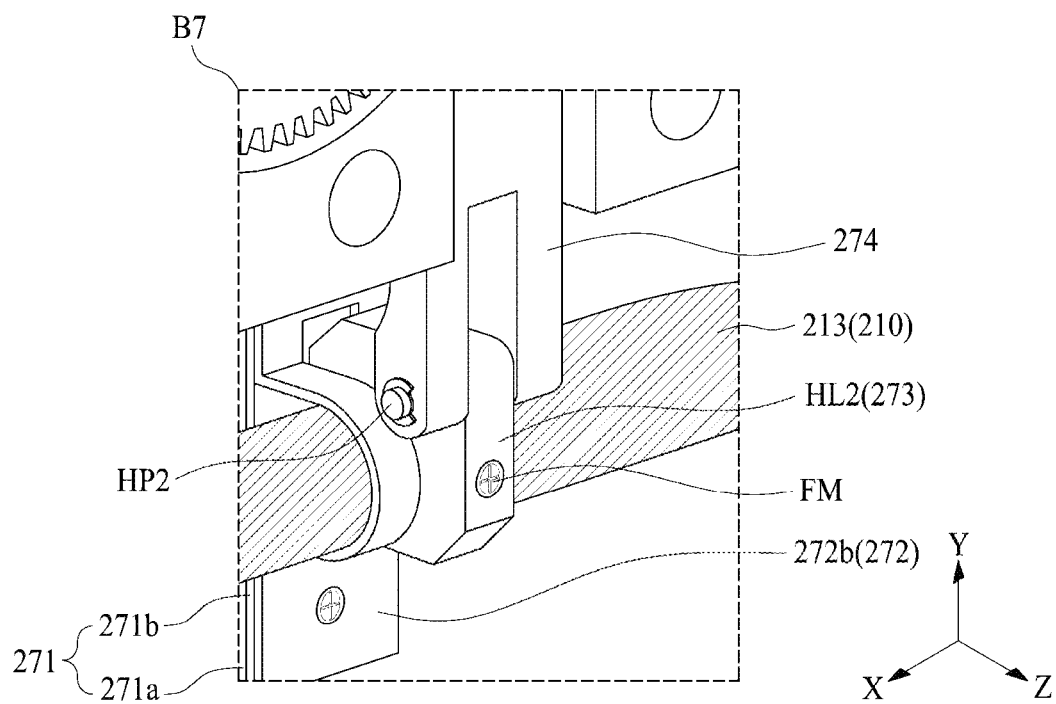
FIG. 17 is an enlarged view of a region 'B7' illustrated in FIG. 14.

FIG. 14 is a diagram for describing a curvature variation unit 200 according to another embodiment of the present disclosure, FIG. 15 is an enlarged view of a region 'B5' illustrated in FIG. 14, FIG. 16 is an enlarged view of a region 'B6' illustrated in FIG. 15, and FIG. 17 is an enlarged view of a region 'B7' illustrated in FIG. 14. The drawings illustrate an example where the curvature variation unit of the display apparatus illustrated in FIGS. 1 to 13 is modified. Hereinafter, therefore, only a curvature variation unit will be described in detail, and in the other elements, like reference numerals refer to like elements and their repetitive descriptions are omitted or will be briefly given.

Referring to FIGS. 14 to 17, the curvature variation unit 200 according to another embodiment of the present disclosure may include an arc member 210, a guider 230, a joint member 250, and a driver 270.

The arc member 210 may be disposed on a rear surface of the display unit 100. For example, the arc member 210 may be disposed on a rear surface of the back cover 120. The arc member 210 may rotate based on driving of the driver 270, and thus, may move both side portions of the display unit 100 in a forward direction or a rearward direction with respect to the display apparatus.

The arc member 210 according to an embodiment may include a first arc member 211 and a second arc member 213.

Except for that the first arc member 211 and the second arc member 213 are disposed on the rear surface of the back cover 120 in parallel, the first arc member 211 and the second arc member 213 according to the present embodiment may be the same as the first arc member 211 and the second arc member 213 illustrated in FIGS. 4 to 6.

Each of the first arc member 211 and the second arc member 213 may have a curved shape which is convex toward a first long side of the display unit 100.

A center portion (or a length center portion) of the first arc member 211 may be adjacent to the first long side of the display unit 100, and both ends (or both side portions) of the first arc member 211 may be adjacent to a vertical center line VCL of the display unit 100.

A center portion (or a length center portion) of the second arc member 213 may be adjacent to a rear center portion of the display unit 100, and both ends (or both side portions) of the second arc member 213 may be adjacent to a left lower corner portion and a right lower corner portion of the display unit 100.

The first arc member 211 and the second arc member 213 may rotate in the same rotational direction while moving in the same rectilinear direction, based on driving of the driver 270.

The guider 230 may be disposed on the rear surface of the display unit 100 in parallel with a second direction Y and may movably support each of a first center portion and a second center portion of the arc member 210. The guider 230 may prevent the partial detachment of the arc member 210 when the arc member 210 having a curved shape is rotating. Therefore, the arc member 210 may be movably disposed in a separation space between the rear surface of the display unit 100 and the center portion of the guider 230, and thus, the guider 230 may prevent the partial detachment of the arc member 210 when the arc member 210 is rotating and both side portions of the display unit 100 may protrude in the forward direction with respect to the display apparatus by using the guider 230 as a supporter.

The guider 230 according to an embodiment may be disposed between a third rear region RA3 and a fourth rear region RA4 of the display unit 100 and may movably support each of the first arc member 211 and the second arc member 213.

The guider 230 according to an embodiment may include first to fourth guide members 235 to 238.

The first guide member 235 may be disposed in the third rear region RA3 of the display unit 100 and may movably support a first center portion of the first arc member 211.

One side and the other side of the first guide member 235 may be fixed to the first rear region RA1 of the display unit 100 with the first arc member 211 therebetween. For example, each of the one side and the other side of the first guide member 235 may be fixed to the first rear region RA1 of the back cover 120 by a coupling member such as a screw or a bolt.

A center portion between the one side and the other side of the first guide member 235 may be disposed in the third rear region RA3 of the back cover 120 to intersect with the first center portion of the first arc member 211. The center portion of the first guide member 235 may be apart from the rear surface of the back cover 120 by a distance which is greater than a diameter of the first arc member 211, with respect to a height of each of the one side and the other side of the first guide member 235. Accordingly, the first center portion of the first arc member 211 may move in a separation space between the center portion of the first guide member 235 and the rear surface of the back cover 120.

The second guide member 236 may be disposed in the fourth rear region RA4 of the display unit 100 and may movably support a second center portion of the first arc member 211. Except for that the second guide member 236 is disposed in the fourth rear region RA4 of the display unit 100 and movably supports the second center portion of the first arc member 211, the second guide member 236 according to the present embodiment may be substantially the same as the first guide member 235, and thus, its repetitive description is omitted.

The third guide member 237 may be disposed in the third rear region RA3 of the display unit 100 and may movably support a first center portion of the second arc member 213. Except for that the third guide member 237 is disposed in the third rear region RA3 of the display unit 100 and movably supports the first center portion of the second arc member 213, the third guide member 237 according to the present embodiment may be substantially the same as the first guide member 235, and thus, its repetitive description is omitted.

The fourth guide member 238 may be disposed in the fourth rear region RA4 of the display unit 100 and may movably support a second center portion of the second arc member 213. Except for that the fourth guide member 238 is disposed in the fourth rear region RA4 of the display unit 100 and movably supports the second center portion of the second arc member 213, the fourth guide member 238 according to the present embodiment may be substantially the same as the first guide member 235, and thus, its repetitive description is omitted.

The joint member 250 may be rotatably disposed in each of the third rear region RA3 and the fourth rear region RA4 of the display unit 100 and may rotatably support both ends of the arc member 210. For example, one end of the joint member 250 may be rotatably disposed in each of the third rear region RA3 and the fourth rear region RA4 of the display unit 100. The joint member 250 may transfer pressure, generated at the both ends of the arc member 210, to each of the third rear region RA3 and the fourth rear region RA4 of the display unit 100 while rotating based on the movement and rotation of the arc member 210, whereby both side portions of the display unit 100 may protrude in a forward direction with respect to a center portion of the display apparatus.

The joint member 250 according to an embodiment may include first to fourth joint members 251, 253, 255, and 257.

The first joint member 251 may be rotatably disposed in the third rear region RA3 of the display unit 100 and may rotatably support one end (or a first end) of the first arc member 211. The first joint member 251 according to an embodiment may include a pin portion inserted into one end of the first arc member 211 and a ring portion which is connected to an end of the pin portion and is rotatably coupled to the third rear region RA3 of the display unit 100. The first joint member 251 may press the third rear region RA3 of the display unit 100 on the basis of pressure applied from the one end of the first arc member 211.

The second joint member 253 may be rotatably disposed in the fourth rear region RA4 of the display unit 100 and may rotatably support the other end (or a second end) of the first arc member 211. The second joint member 253 according to an embodiment may include a pin portion inserted into the other end of the first arc member 211 and a ring portion which is connected to an end of the pin portion and is rotatably coupled to the fourth rear region RA4 of the display unit 100. The second joint member 253 may press the fourth rear region RA4 of the display unit 100 on the basis of pressure applied from the other end of the first arc member 211.

The third joint member 255 may be rotatably disposed in the third rear region RA3 of the display unit 100 and may rotatably support one end (or a first end) of the second arc member 213. The third joint member 255 according to an embodiment may include a pin portion inserted into one end of the second arc member 213 and a ring portion which is connected to an end of the pin portion and is rotatably coupled to the third rear region RA3 of the display unit 100. The third joint member 255 may press the third rear region RA3 of the display unit 100 on the basis of pressure applied from the one end of the second arc member 213.

The fourth joint member 257 may be rotatably disposed in the fourth rear region RA4 of the display unit 100 and may rotatably support the other end of the second arc member 213. The fourth joint member 257 according to an embodiment may include a pin portion inserted into the other end of the second arc member 213 and a ring portion which is connected to an end of the pin portion and is rotatably coupled to the fourth rear region RA4 of the display unit 100. The fourth joint member 257 may press the fourth rear region RA4 of the display unit 100 on the basis of pressure applied from the other end of the second arc member 213.

The curvature variation unit 200 according to another embodiment of the present disclosure may further include a fixing bracket 260.

The fixing bracket 260 may be disposed in each of the third rear region RA3 and the fourth rear region RA4 of the display unit 100 and may rotatably support the joint member 250. For example, the fixing bracket 260 may be disposed in each of the third rear region RA3 and the fourth rear region RA4 of the display unit 100 and may be coupled (or fixed)

to the rear surface of the back cover 120. When each of the first arc member 211 and the second arc member 213 is rotating, the fixing bracket 260 may transfer pressure, generated at the end of each of the first arc member 211 and the second arc member 213, to the display unit 100. In this case, the fixing bracket 260 may allow the end of each of the first arc member 211 and the second arc member 213 to surface-contact the display unit 100, and thus, may prevent the local damage of the display unit 100 caused by a local point-contact between the end of each of the first arc member 211 and the second arc member 213 and the display unit 100.

The fixing bracket 260 according to an embodiment may include first and second fixing brackets 261 and 263.

The first fixing bracket 261 may be disposed at a third rear edge portion of the display unit 100 and may rotatably support the other side (or a ring portion) of the joint member 250. For example, the first fixing bracket 261 may be fixed to the third rear region RA3 adjacent to a right edge portion of the back cover 120 and may rotatably support the other side (or a ring portion) of each of the first joint member 251 and the third joint member 255.

The second fixing bracket 263 may be disposed at a fourth rear edge portion of the display unit 100 and may rotatably support the other side (or a ring portion) of the joint member 250. For example, the second fixing bracket 263 may be fixed to the fourth rear region RA4 adjacent to a left edge portion of the back cover 120 and may rotatably support the other side (or a ring portion) of each of the second joint member 253 and the fourth joint member 257.

The driver 270 may be disposed in a rear center region of the display unit 100. The driver 270 may be disposed between the first arc member 211 and the second arc member 213.

The driver 270 may simultaneously rotate the first arc member 211 and the second arc member 213 while simultaneously moving the first arc member 211 and the second arc member 213. The driver 270 may simultaneously rotate the first arc member 211 and the second arc member 213 in the same rotational directions while simultaneously moving the first arc member 211 and the second arc member 213 in the same rectilinear directions. For example, the driver 270 may rotate the first arc member 211 by a maximum of 90 degrees in a first rotational direction while rectilinearly moving the first arc member 211, and simultaneously, may rotate the second arc member 213 by a maximum of 90 degrees in a second rotational direction while rectilinearly moving the second arc member 213. On the other hand, the driver 270 may rotate the first arc member 211 by a maximum of 90 degrees in the second rotational direction while rectilinearly moving the first arc member 211, and simultaneously, may rotate the second arc member 213 by a maximum of 90 degrees in the first rotational direction while rectilinearly moving the second arc member 213.

The driver 270 may simultaneously rotate the first arc member 211 and the second arc member 213 while simultaneously moving the first arc member 211 and the second arc member 213, through a rectilinear motion based on a rotational motion of a rotary motor.

The driver 270 according to an embodiment may include a guide plate 271, a holder 272, a holder link 273, a sliding block 274, at least one rotary motor 275, and a gear assembly 276.

The guide plate 271 may be disposed to overlap a rear center portion of the display unit 100. For example, the guide plate 271 may be implemented to have a certain width parallel to a first direction X and a certain length parallel to a second direction Y and may be disposed on (or coupled to) the rear surface of the back cover 120 to overlap a center portion (or a length center portion) of each of the first arc member 211 and the second arc member 213. The guide plate 271 may support the at least one rotary motor 275 and the gear assembly 276 and may slidably support the holder 272, the holder link 273, and the sliding block 274.

The guide plate 271 according to an embodiment may include a rail plate 271a and a sliding plate 271b.

The rail plate 271a may be coupled to the rear surface of the back cover 120 to overlap a rear center portion of the display unit 100 and may slidably support the sliding plate 271b. The rail plate 271a may include a guide rail for guiding a rectilinear motion of the sliding plate 271b.

The sliding plate 271b may be slidably connected to the rail plate 271a. The sliding plate 271b may include a guide groove into which the guide rail of the rail plate 271a is inserted. The sliding plate 271b may slidably support the holder 272, the holder link 273, and the sliding block 274.

The holder 272 may be coupled to the sliding plate 271b of the guide plate 271 and may rotatably support a center portion of the arc member 210. Therefore, the center portion of the arc member 210 may be rotatably disposed between the sliding plate 271b and the holder 272. Additionally, the driver 270 according to an embodiment may further include a bearing disposed between the center portion of the arc member 210 and the holder 272.

The holder 272 according to an embodiment may include a first holder 272a, which is coupled to the sliding plate 271b of the guide plate 271 to rotatably support a center portion of the first arc member 211, and a second holder 272b which is coupled to the guide plate 271 to rotatably support a center portion of the second arc member 213.

Both ends of each of the first holder 272a and the second holder 272b according to an embodiment may be coupled to the sliding plate 271b by a coupling member such as a screw or a bolt.

The driver 270 according to an embodiment may further include a first bearing disposed between the center portion of the first arc member 211 and the first holder 272a and a second bearing disposed between the center portion of the second arc member 213 and the second holder 272b.

The holder link 273 may rotatably support the center portion of the arc member 210. For example, the holder link 273 may include a through hole which the arc member 210 passes through. As another example, the holder link 273 may include a U-shaped cross-sectional structure which surrounds a portion of the arc member 210. For example, the holder link 273 may be disposed to surround a portion of the holder 272 and may be fixed to the holder 272 by a fixing member FM such as a screw or a bolt.

The holder link 273 according to an embodiment may include a first holder link HL1 which rotatably supports the center portion of the first arc member 211 and a second holder link HL2 which rotatably supports the center portion of the second arc member 213.

The first holder link HL1 may include a U-shaped cross-sectional structure which surrounds a portion of the first arc member 211. For example, the first holder link HL1 may be disposed to surround a portion of the first holder 272a and may be fixed to the first holder 272a by a fixing member FM such as a screw or a bolt.

The second holder link HL2 may include a U-shaped cross-sectional structure which surrounds a portion of the second arc member 213. For example, the second holder link HL2 may be disposed to surround a portion of the second holder 272b and may be fixed to the second holder 272b by a fixing member FM such as a screw or a bolt.

The sliding block 274 may be connected to the holder link 273 and may allow the holder link 273 to perform a rectilinear motion in the second direction Y on the basis of driving of the driver 270.

The sliding block 274 according to an embodiment may be rotatably connected to the first holder link HL1, and moreover, may be rotatably connected to the second holder link HL2. For example, one end of the sliding block 274 may be rotatably connected to the first holder link HL1 by the first hinge pin HP1. The other end of the sliding block 274 may be rotatably connected to the second holder link HL2 by the second hinge pin HP2. The sliding block 274 may allow the first holder link HL1 and the second holder link HL2 to simultaneously perform a rectilinear motion in the same direction on the basis of driving of the driver 270.

The sliding block 274 according to an embodiment may include a rack gear RG.

The rack gear RG according to an embodiment may be implemented on one side surface and the other side surface of the sliding block 274 parallel to the second direction Y.

The rack gear RG according to an embodiment may include a first rack gear RG1 implemented on the one side surface (or first outside surface) of the sliding block 274 and a second rack gear RG2 implemented on the other side surface (or second outside surface) of the sliding block 274.

The at least one rotary motor 275 may be disposed in a rear center region of the display unit 100 and may be supported by the guide plate 271. The at least one rotary motor 275 may provide a rotational force to the gear assembly 276 in response to manipulation of the user for varying a curvature of the display unit 100.

The driver 270 according to the present embodiment may include first and second rotary motors 275a and 275b (or a pair of rotary motors), for maintaining balance, decreasing noise, and securing a driving force (or rotational force) margin.

The first and second rotary motors 275a and 275b may be disposed in parallel with each other with the gear assembly 276 therebetween. A driving shaft (or a rotational shaft) of each of the first rotary motor 275a and the second rotary motor 275b may be disposed adjacent to the first arc member 211. In this case, the first and second rotary motors 275a and 275b may rotate in the same direction.

The gear assembly 276 may be disposed on the supporting plate 271 and may be connected to the rotary motor 275. The gear assembly 276 may allow the sliding block 274 to perform a rectilinear motion on the basis of a rotational motion of the rotary motor 275 and may rotate the arc member 210 on the basis of the movement of the holder link 273 based on the rectilinear motion of the sliding block 274. For example, the gear assembly 276 may allow the sliding block 274 to perform a rectilinear motion on the basis of the rotational motion of the rotary motor 275, and thus, may simultaneously rotate each of the first arc member 211 and the second arc member 213 while simultaneously moving each of the first arc member 211 and the second arc member 213. The gear assembly 276 may be referred to as a gear box or a reduction gear part, but is not limited thereto.

The gear assembly 276 according to an embodiment may include a first pinion gear PG1, a second pinion gear PG2, and a rotation transfer part RTP.

The first pinion gear PG1 may be connected (or engaged) between the first rack gear RG1 of the sliding block 274. The first pinion gear PG1 may allow the first rack gear RG1 to perform a rectilinear motion on the basis of a rotational motion. For example, the first pinion gear PG1 may rotate in the first rotational direction to allow the first rack gear RG1 to perform a rectilinear motion in a first rectilinear direction Y+ parallel to the second direction Y. On the other hand, the first pinion gear PG1 may rotate in the second rotational direction to allow the first rack gear RG1 to perform a rectilinear motion in a second rectilinear direction Y−.

The second pinion gear PG2 may be connected (or engaged) between the second rack gear RG2 of the sliding block 274. The second pinion gear PG2 may allow the second rack gear RG2 to perform a rectilinear motion on the basis of a rotational motion. For example, the second pinion gear PG2 may rotate in the second rotational direction to allow the second rack gear RG2 to perform a rectilinear motion in the first rectilinear direction Y+. On the other hand, the second pinion gear PG2 may rotate in the first rotational direction to allow the second rack gear RG2 to perform a rectilinear motion in the second rectilinear direction Y−.

The rotation transfer part RTP may transfer a rotational motion of the rotary motor 275 to the pinion gear PG. The rotation transfer part RTP may reduce a rotation speed of the rotary motor 275 to rotate the pinion gear PG. For example, the rotation transfer part RTP may transfer a rotational motion of the first rotary motor 275a to the pinion gear PG, and simultaneously, may transfer a rotational motion of the second rotary motor 275b to the second pinion gear PG2.

The rotation transfer part RTP according to an embodiment may include a first worm 276a, a first worm gear WG1, a first spur gear SG1, a second worm 276b, a second worm gear WG2, and a second spur gear SG2.

The first worm 276a may be connected to a driving shaft of the first rotary motor 275a. The first worm 276a may rotate in the first rotational direction on the basis of a rotation of the first rotary motor 275a performed in the first rotational direction, or may rotate in the second rotational direction on the basis of a rotation of the first rotary motor 275a performed in the second rotational direction.

The first worm gear WG1 may be connected (or engaged) to the first worm 276a and may rotate based on a rotational motion of the first worm 276a. For example, the first worm gear WG1 may rotate by one gear when the first worm 276a rotates once. A rotational-shaft direction of the first worm gear WG1 may be perpendicular to a rotational-shaft direction of the first worm 276a. For example, the rotational-shaft direction of the first worm 276a may be parallel to the second direction Y, and the rotational-shaft direction of the first worm gear WG1 may be parallel to the thickness direction Z of the back cover 120.

The first worm gear WG1 according to an embodiment may include a double gear structure which includes a lower worm gear having a first size and an upper worm gear having a second size which is less than the first size. For example, in the first worm gear WG1 having the double gear structure, the lower worm gear may be connected (or engaged) to the first worm 276a, and the upper worm gear may be connected (or engaged) to the first spur gear SG1.

The first spur gear SG1 may be connected (or engaged) to the first worm gear WG1 and may perform a rotational motion in a direction opposite to a rotational-motion direction of the first worm gear WG1.

The first spur gear SG1 according to an embodiment may include a double gear structure which includes a lower worm gear having a first size and an upper worm gear having a second size which is less than the first size. For example, in the first spur gear SG1 having the double gear structure, the lower spur gear may be connected (or engaged) to the upper worm gear of the first worm gear WG1, and the upper spur gear may be connected (or engaged) to the first pinion gear PG1.

The second worm 276b may be connected to a driving shaft of the second rotary motor 275b. The first worm 276b may rotate in the first rotational direction on the basis of a rotation of the second rotary motor 275b performed in the first rotational direction, or may rotate in the second rotational direction on the basis of a rotation of the second rotary motor 275b performed in the second rotational direction.

The second worm gear WG2 may be connected (or engaged) to the second worm 276b and may rotate based on a rotational motion of the second worm 276b. For example, the second worm gear WG2 may rotate by one gear when the second worm 276b rotates once. A rotational-shaft direction of the second worm gear WG2 may be perpendicular to a rotational-shaft direction of the second worm 276b. For example, the rotational-shaft direction of the second worm 276b may be parallel to the second direction Y, and the rotational-shaft direction of the second worm gear WG2 may be parallel to the thickness direction Z of the back cover 120.

The second worm gear WG2 according to an embodiment may include a double gear structure which includes a lower worm gear having a first size and an upper worm gear having a second size which is less than the first size. For example, in the second worm gear WG2 having the double gear structure, the lower worm gear may be connected (or engaged) to the second worm 276b, and the upper worm gear may be connected (or engaged) to the second spur gear SG2.

The second spur gear SG2 may be connected (or engaged) to the second worm gear WG2 and may perform a rotational motion in a direction opposite to a rotational-motion direction of the second worm gear WG2.

The second spur gear SG2 according to an embodiment may include a double gear structure which includes a lower worm gear having a first size and an upper worm gear having a second size which is less than the first size. For example, in the second spur gear SG2 having the double gear structure, the lower spur gear may be connected (or engaged) to the upper worm gear of the second worm gear WG2, and the upper spur gear may be connected (or engaged) to the second pinion gear PG2.

Optionally, the driver 270 according to the present embodiment may be implemented with only the first rotary motor 275a, and in this case, each of the second rack gear RG2, the second rotary motor 275b, the second pinion gear PG2, the second worm 276b, the second work gear WG2, and the second spur gear SG2 described above may be omitted.

The driver 270 of the curvature variation unit 200 according to an embodiment of the present disclosure may further include a limit switch unit 277.

The limit switch unit 277 may be disposed on the guide plate 271 and may limit a distance of a rectilinear motion of the sliding block 274. For example, the limit switch unit 277 may be implemented to limit a maximum distance of a rectilinear motion of the rack gear RG on the basis of a physical contact with the sliding block 274.

The limit switch unit 277 according to an embodiment may include a first limit switch unit 277a and a second limit switch unit 277b.

The first limit switch unit 277a may limit a maximum rectilinear motion distance of the sliding block 274 based on the second rectilinear direction Y−. The first limit switch unit 277a may limit a maximum rotational angle of the arc member 210, or may limit a maximum curvature of the display unit 100.

The first limit switch unit 277a according to an embodiment may include a first limit switch LS1 and a first stopper SP1.

The first limit switch LS1 may be fixed to the guide plate 271 overlapping a through slit 274a passing through the sliding block 274 and may be disposed in the through slit 274a. For example, the first limit switch LS1 may be disposed on the rail plate 271a of the guide plate 271 so as to be apart from the first arc member 211 by a certain distance and may be disposed in the through slit 274a passing through the sliding plate 271b and the sliding block 274.

The first stopper SP1 may be a first short sidewall, which is adjacent to the first arc member 211 and is parallel to the first direction X, of a sidewall of the through slit 274a disposed in the sliding block 274.

When the first limit switch LS1 physically contacts the first short sidewall of the through slit 274a disposed in the sliding block 274 which performs a rectilinear motion in the second rectilinear direction Y−, the first limit switch LS1 may generate a first limit signal and may provide the first limit signal to the curvature variation control circuit. The curvature variation control circuit may stop a rotation of the rotary motor 275 in response to the first limit signal provided from the first limit switch LS1.

The second limit switch unit 277b may limit a maximum rectilinear motion distance of the sliding block 274 based on the first rectilinear direction Y+. The second limit switch unit 277b according to an embodiment may include a second limit switch LS2 and a second stopper SP2.

The second limit switch LS2 may be fixed to the guide plate 271 between the first limit switch LS1 and the second arc member 213 and may be disposed in the through slit 274a. For example, the second limit switch LS2 may be disposed on the rail plate 271a of the guide plate 271 so as to be adjacent to the first limit switch LS1 and may be disposed in the through slit 274a passing through the sliding plate 271b and the sliding block 274.

The second stopper SP2 may be a second short sidewall, which is adjacent to the second arc member 213 and is parallel to the first direction X, of the sidewall of the through slit 274a disposed in the sliding block 274.

When the second limit switch LS2 physically contacts the second short sidewall of the through slit 274a disposed in the sliding block 274 which performs a rectilinear motion in the first rectilinear direction Y+, the second limit switch LS2 may generate a second limit signal and may provide the second limit signal to the curvature variation control circuit. The curvature variation control circuit may stop a rotation of the rotary motor 275 in response to the second limit signal provided from the second limit switch LS2.

The curvature variation unit 200 according to another embodiment of the present disclosure may further include a gear box 278.

The gear box 278 may be coupled to the rail plate 271a of the guide plate 271 or the rear surface of the back cover 120 and may support the driver 270.

The gear box 278 may be supported by or mounted on a post of a stand. To this end, the gear box 278 may include a plurality of mount coupling parts 278a. The plurality of mount coupling parts 278a may be disposed at each of an upper side and a lower side of the gear box 278 and may include a horizontal symmetrical structure with respect to the sliding block 274.

Figure 18A:
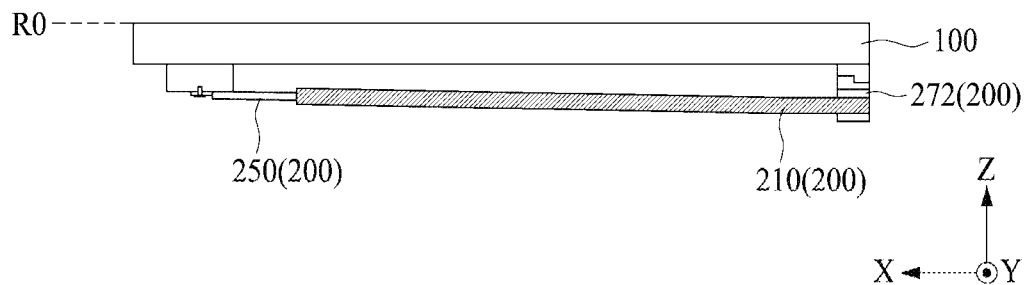
FIG. 18A is a cross-sectional view illustrating a flat shape of a display apparatus according to an embodiment of the present disclosure.
Figure 18B:
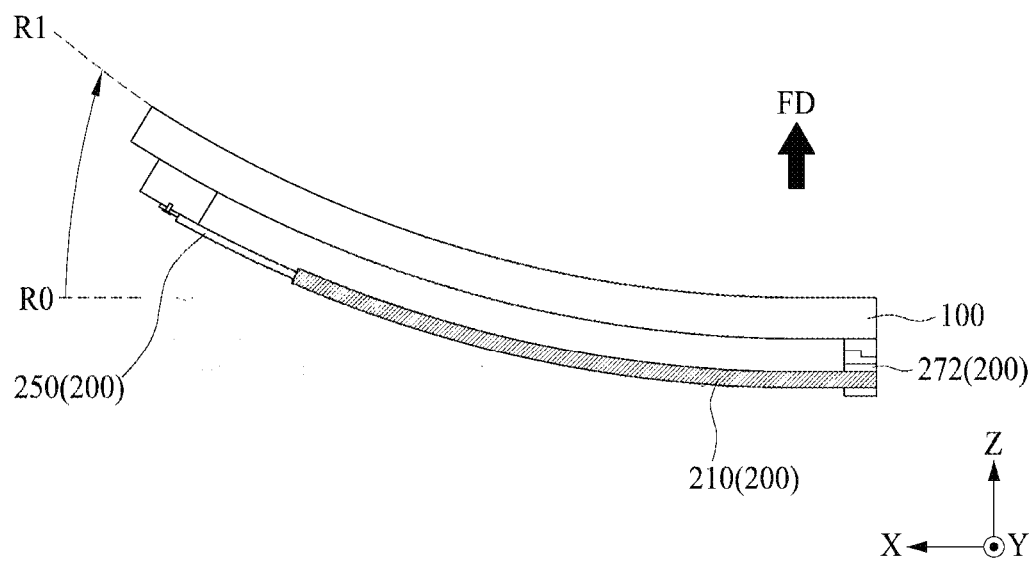
FIG. 18B is a cross-sectional view illustrating a curvature variation state of a display apparatus according to an embodiment of the present disclosure.

FIG. 18A is a cross-sectional view illustrating a flat shape of a display apparatus according to an embodiment of the present disclosure, and FIG. 18B is a cross-sectional view illustrating a curvature variation state of a display apparatus according to an embodiment of the present disclosure.

Referring to FIG. 18A, in a display apparatus according to the present disclosure, a display unit 100 may be disposed (or implemented) in a flat shape having a curvature R0 of 0 (zero). For example, as illustrated in FIG. 15, the rotary motor 275 of the curvature variation unit 200 may be in a state where a rotational motion stops based on the second limit signal of the second limit switch 277b.

In response to manipulation of a user, as illustrated in FIGS. 1, 2, and 18B, the display unit 100 having a flat shape may be disposed (or implemented) in a curved shape having a curvature R1 other than 0 (zero). For example, as illustrated in FIG. 15, as the sliding block 274 performs a rectilinear motion in the second rectilinear direction Y− on the basis of a rotational motion of the rotary motor 275 based on manipulation of the user in a state which is laid in parallel with the rear surface of the display unit 100, the arc member 210 of the curvature variation unit 200 may rotate by a maximum of 90 degrees in the first rotational direction while moving in the second rectilinear direction Y− and thus may stand in the thickness direction Z of the display unit 100, and moreover, pressure generated in an end of the arc member 210 standing through rotation may be applied to the display unit 100 through the joint member 250 and the fixing bracket 260, whereby both side portions of the display unit 100 may protrude in the forward direction FD with respect to a center portion of the display apparatus. As a result, the both side portions of the display unit 100 may protrude in the forward direction FD with respect to the center portion of the display apparatus on the basis of a rectilinear motion of the arc member 210 and a rotational motion of the arc member 210 standing in the thickness direction Z of the display unit 100, and thus, the display unit 100 may vary in a curved shape having the curvature R1 other than 0 (zero). For example, as illustrated in FIG. 15, the rotary motor 275 of the curvature variation unit 200 which varies the display unit 100 to a curved shape may stop a rotational motion on the basis of the first limit signal of the first limit switch 277a.

On the other hand, as illustrated in FIG. 15, as the sliding block 274 moves in the first rectilinear direction Y+ on the basis of a rotational motion of the rotary motor 275 based on manipulation of the user, the arc member 210 of the curvature variation unit 200 may rotate by a maximum of 90 degrees in the second rotational direction while moving the first rectilinear direction Y+, and thus, may be laid in parallel with the rear surface of the display unit 100, whereby the display unit 100 may be disposed (or implemented) in a flat shape having a curvature R0 of 0 (zero) one basis of an elastic restoring force.

Figure 19:
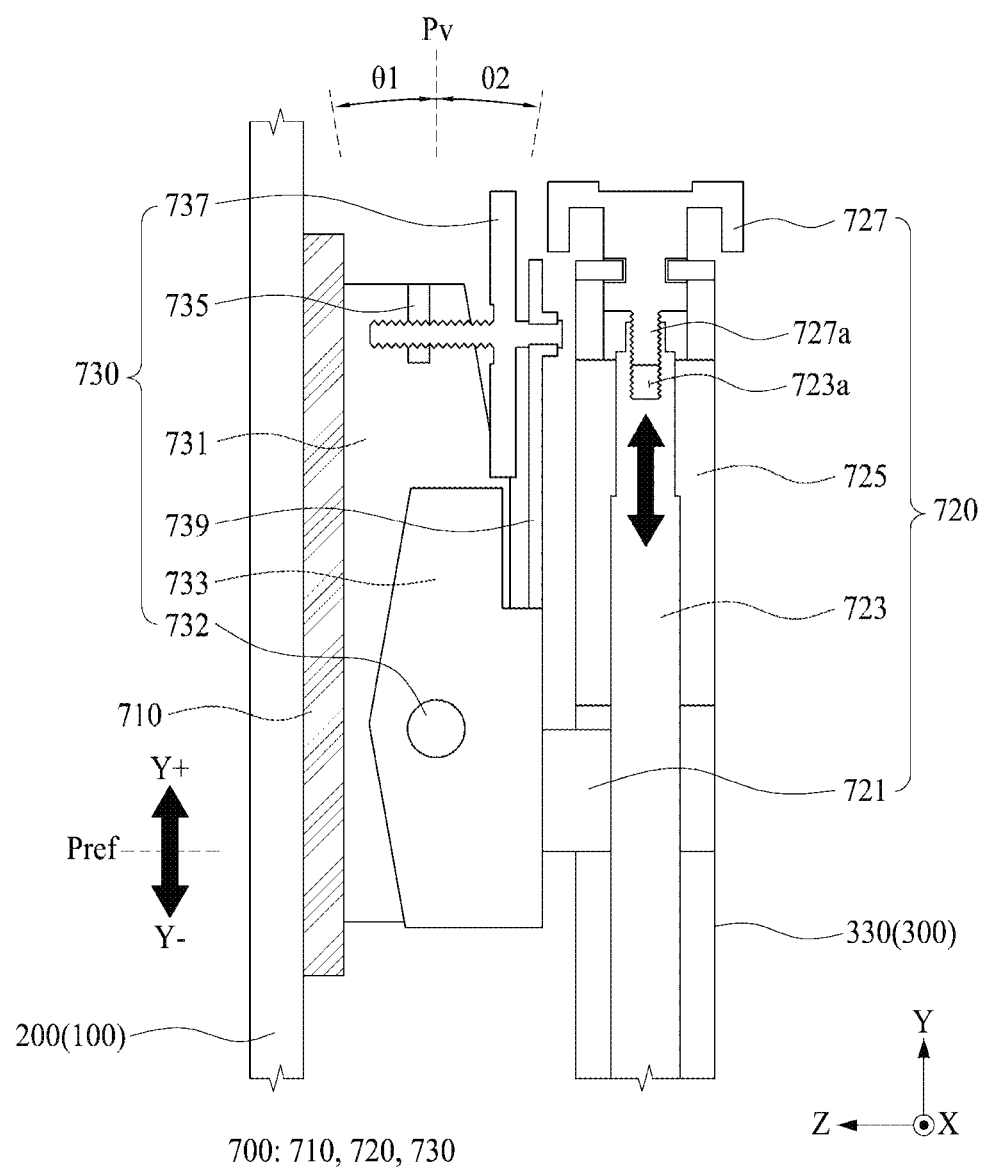
FIG. 19 is a diagram for describing a position control unit according to an embodiment of the present disclosure.

FIG. 19 is a diagram for describing a position control unit 700 according to an embodiment of the present disclosure.

Referring to FIGS. 1 and 19, the position control unit 700 according to an embodiment of the present disclosure may be implemented to raise (Y+) or lower (Y−) a height of the display unit 100 mounted on the stand 300.

The position control unit 700 may include a supporting bracket 710 and a display elevation unit 720.

The supporting bracket 710 may be coupled to the rear surface of the display unit 100. The supporting bracket 710 according to an embodiment may be coupled to the gear box 278 of the curvature variation unit 200 disposed on the rear surface of the display unit 100 illustrated in FIGS. 14 and 15. For example, the supporting bracket 710 may be coupled to the gear box 278 by a fastening member such as a screw or a bolt, or may support the gear box 278. The fastening member may be coupled to a plurality of mount coupling parts 278a disposed in the gear box 278.

The display elevation unit 720 may be disposed at the post 330 of the stand 300 and may be connected to the supporting bracket 710. The display elevation unit 720 may raise (Y+) or lower (Y−) the supporting bracket 710 on the basis of manipulation of a user performed on an elevation control knob 727 to adjust a height of the display unit 100 mounted on the supporting bracket 710. For example, the display elevation unit 720 may raise or lower the supporting bracket 710 by using a screw manner to raise or lower a height of the display unit 100 at a reference position Pref.

The display elevation unit 720 according to an embodiment may include a connection frame 721, an elevation shaft 723, an elevation guider 725, and an elevation control knob 727.

The connection frame 721 may be disposed in the thickness direction Z of the display unit 100, and may pass through an inner sidewall of the post 330 of the stand 300 and may be coupled to the supporting bracket 710.

The elevation shaft 723 may be disposed in the post 300 in parallel with the second direction Y so as to be raised and lowered and may be coupled to the connection frame 721.

The elevation guider 725 may be disposed in the post 330 in parallel with the second direction Y and may guide the raising or lowering of the elevation shaft 723. For example, the elevation guider 725 may include a guide rail which guides the raising or lowering of the elevation shaft 723. In this case, the elevation shaft 723 may include a guide groove into which the guide rail of the elevation guider 725 is inserted and may be raised or lowered in the second direction Y along the guide rail of the elevation guider 725.

The elevation control knob 727 may be rotatably disposed on a top surface of the post 330 and may be connected to an upper portion of the elevation shaft 723. The elevation control knob 727 may rotate in the first rotational direction to raise (Y+) the elevation shaft 723 on the basis of manipulation of a user and may rotate a second rotational direction to lower (Y−) the elevation shaft 723 on the basis of manipulation of the user. To this end, the elevation control knob 727 may include a screw thread portion 727a, and the elevation shaft 723 may include a screw hole 723a which is disposed at an upper portion thereof and is connected (or engaged) to the screw thread portion 727a of the elevation control knob 727.

The screw thread portion 727a of the elevation control knob 727 may rotate based on a rotation of the elevation control knob 727 to allow the elevation shaft 723 to perform a rectilinear motion in the second direction Y. For example, when the elevation control knob 727 rotates in the first rotational direction, the screw thread portion 727a may rotate in the first rotational direction to rectilinearly move (or raise) the elevation shaft 723 in the second direction Y. On the other hand, when the elevation control knob 727 rotates in the second rotational direction, the screw thread portion 727a may rotate in the second rotational direction to rectilinearly move (or raise) the elevation shaft 723 in the second direction Y.

The position control unit 700 according to an embodiment of the present disclosure may be implemented to tilt the display unit 100, having a vertical state Pv which is mounted on the stand 300, at a certain angle (θ1, θ2). To this end, the position control unit 700 may further include a display tilt unit 730.

The display tilt unit 730 may be disposed between the supporting bracket 710 and the display elevation unit 720 and may tilt the display unit 100 at a certain angle (θ1, θ2) on the basis of manipulation of the user.

The display tilt unit 730 according to an embodiment may include a tilt housing 731, a supporting frame 733, a ball nut 735, a tilt control knob 737, and a knob supporting part 739.

The tilt housing 731 may be coupled to a rear surface of the supporting bracket 710. For example, the tilt housing 731 may be coupled to the rear surface of the supporting bracket 710, between the supporting bracket 710 and the post 330 of the stand 300.

The supporting frame 733 may be supported by (or coupled to) the connection frame 721 of the display elevation unit 720 and may rotatably support the tilt housing 731. The tilt housing 731 may be rotatably supported by the supporting frame 733 with respect to a tilt shaft 732.

The ball nut 735 (or a ball screw nut) may be fixed to an internal upper portion of the tilt housing 731.

The tilt control knob 737 may be disposed on a rear surface of the tilt housing 731 and may be connected (or engaged) to the ball nut 735. The tilt control knob 737 may include a ball screw which passes through the rear surface of the tilt housing 731 and is connected (or engaged) to the ball nut 735.

The tilt control knob 737 may rotate in the first rotational direction on the basis of manipulation of the user to forward move the ball nut 735 in the thickness direction Z of the display unit 100, and thus, may tilt the tilt housing 731 by a first angle θ1 with respect to the tilt shaft 732 corresponding to a rotational shaft. For example, in the display unit 100 having the vertical state Pv, when the tilt control knob 737 rotates in the first rotational direction, an upper portion, other than a lower portion, of the display unit 100 may protrude in a forward direction with respect to the display apparatus, and thus, the display unit 100 may be tilted by the first angle θ1 from the vertical state Pv.

On the other hand, the tilt control knob 737 may rotate in the second rotational direction on the basis of manipulation of the user to backward move the ball nut 735 in the thickness direction Z of the display unit 100, and thus, may restore the tilt housing 731 from the vertical state Pv to an original state or may tilt the tilt housing 731 by a second angle θ2, with respect to the tilt shaft 732 corresponding to a rotational shaft. For example, in the display unit 100 having the vertical state Pv, when the tilt control knob 737 rotates in the second rotational direction, the lower portion, other than the upper portion, of the display unit 100 may protrude in the forward direction with respect to the display apparatus, and thus, the display unit 100 may be tilted by the second angle θ2 from the vertical state Pv.

The knob supporting part 739 may be coupled to an upper portion of the supporting frame 733 or may protrude from the upper portion of the supporting frame 733 and may rotatably support the tilt control knob 737. The knob supporting part 739 may rotatably support a protrusion shaft protruding from a rear surface of the tilt control knob 737. Accordingly, the tilt control knob 737 may not perform a rectilinear motion but may perform a rotational motion at a fixed position with respect to the knob supporting part 739 corresponding to a supporter, thereby allowing the ball nut 735 to perform a rectilinear motion.

As described above, in a display apparatus including a position control unit 700 according to the present embodiment, a height and an angle of the display unit 100 may be controlled based on manipulation of a user, thereby providing a viewing height and a viewing angle suitable for a preference of the user.

Figure 20:
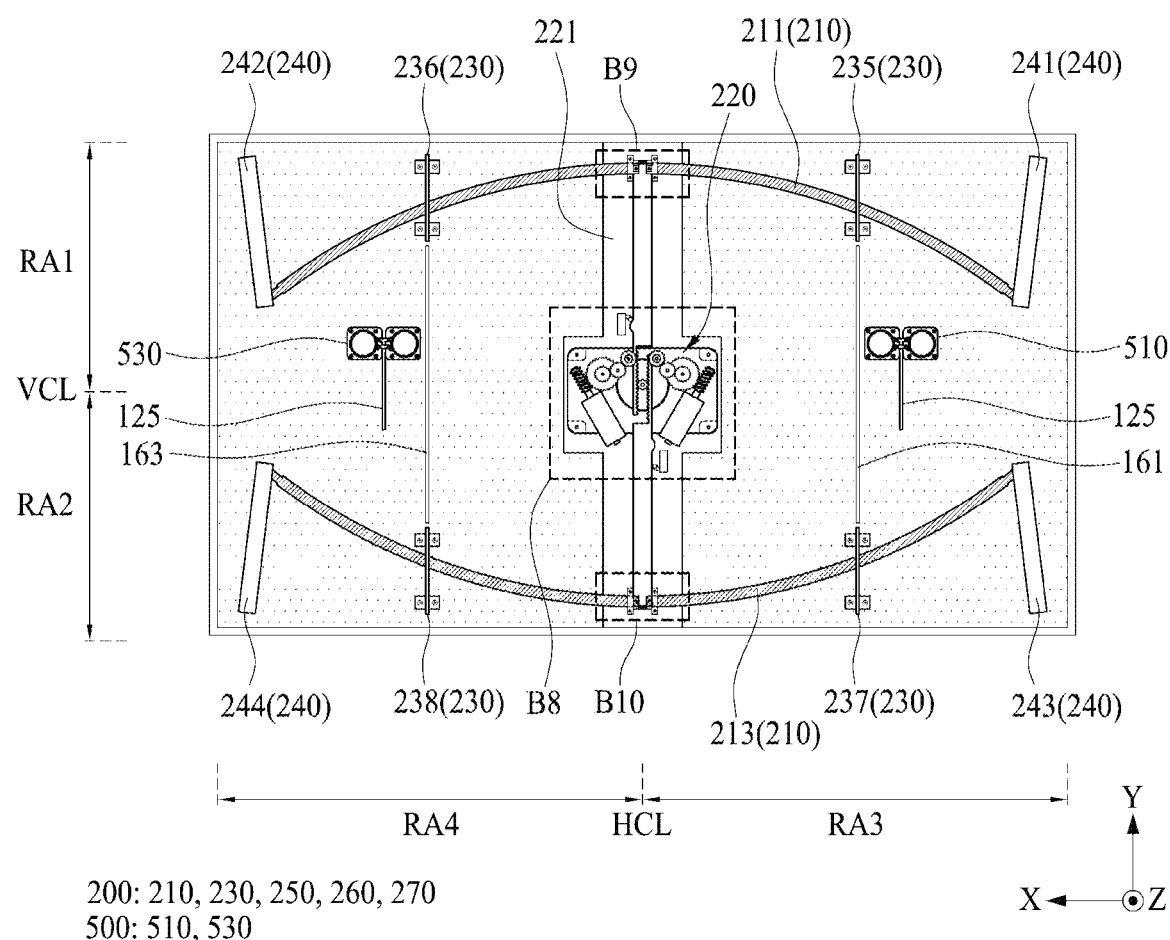
FIG. 20 is a diagram for describing a curvature variation unit according to another embodiment of the present disclosure.
Figure 21:
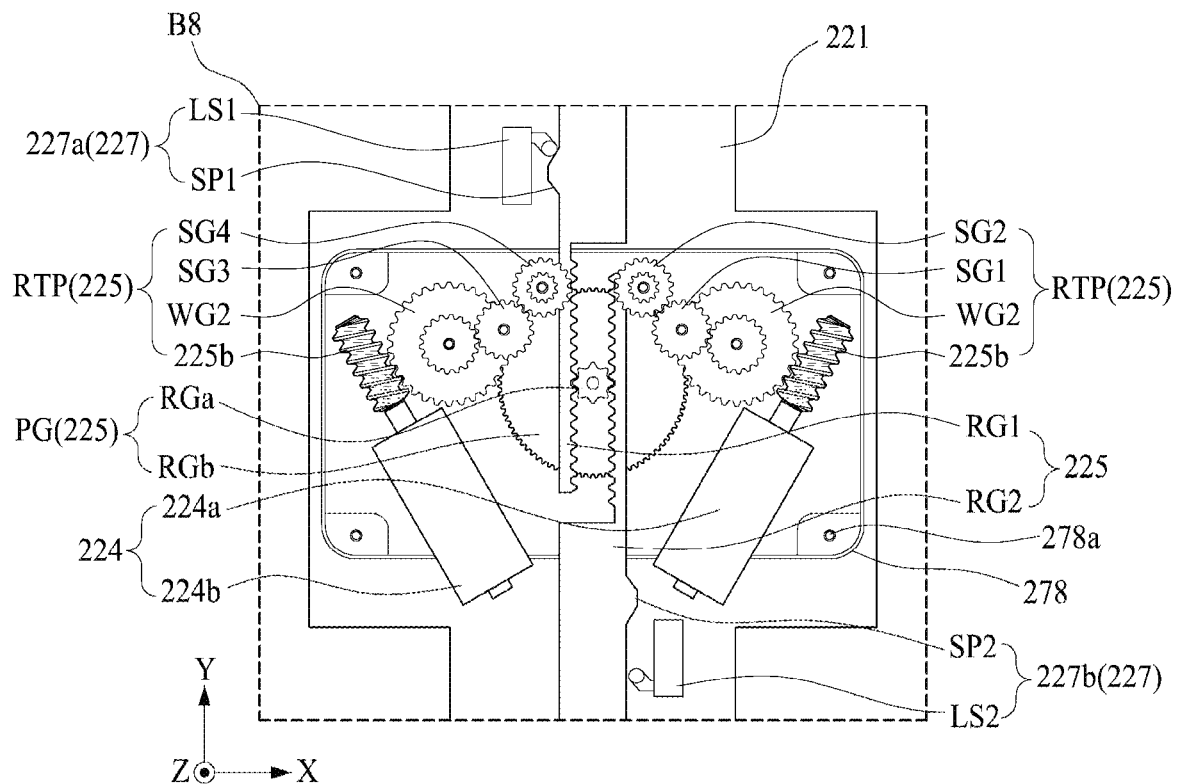
FIG. 21 is an enlarged view of a region 'B8' illustrated in FIG. 20.
Figure 22:
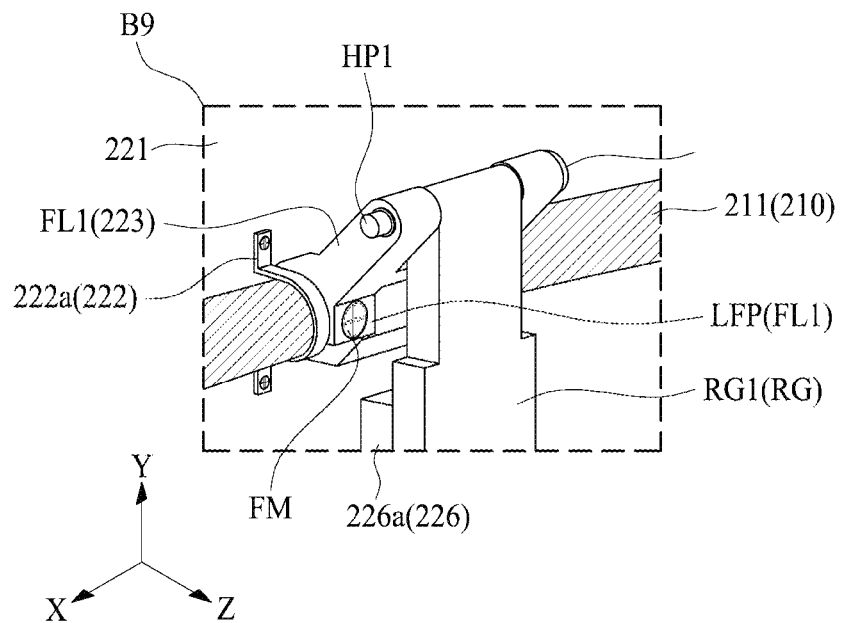
FIG. 22 is an enlarged view of a region 'B9' illustrated in FIG. 20.
Figure 23:
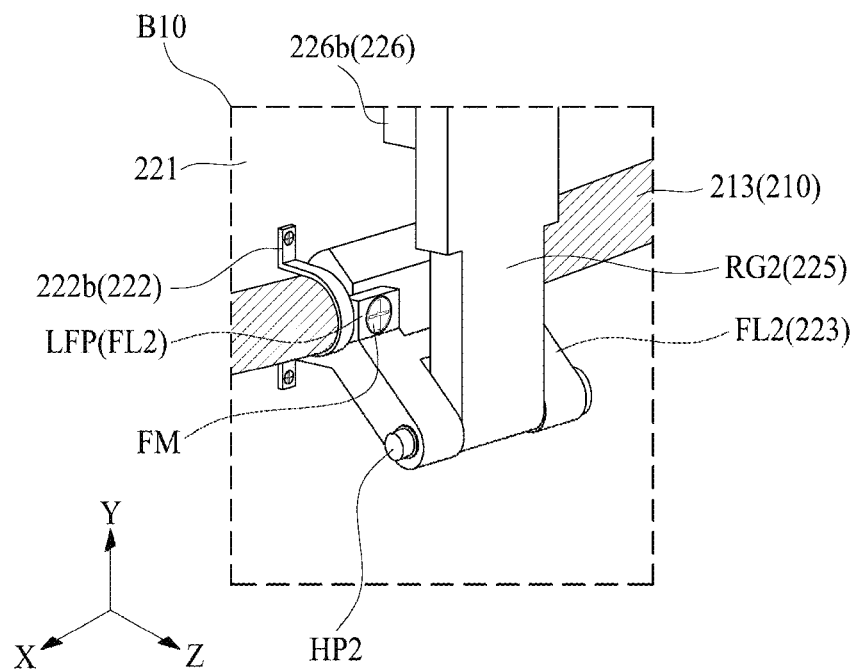
FIG. 23 is an enlarged view of a region 'B10' illustrated in FIG. 20.

FIG. 20 is a diagram for describing a curvature variation unit 200 according to another embodiment of the present disclosure, FIG. 21 is an enlarged view of a region 'B8' illustrated in FIG. 20, FIG. 22 is an enlarged view of a region 'B9' illustrated in FIG. 20, and FIG. 23 is an enlarged view of a region 'B10' illustrated in FIG. 20. The drawings illustrate an example where the curvature variation unit of the display apparatus illustrated in FIGS. 1 to 13 is modified. Hereinafter, therefore, only a curvature variation unit will be described in detail, and in the other elements, like reference numerals refer to like elements and their repetitive descriptions are omitted or will be briefly given.

Referring to FIGS. 20 to 23, the curvature variation unit 200 according to another embodiment of the present disclosure may include an arc member 210, a guider 230, and a driver 220.

The arc member 210 may be disposed on a rear surface of a display unit 100. For example, the arc member 210 may be disposed on a rear surface of a back cover 120. The arc member 210 may rotate based on driving of the driver 220, and thus, may move both side portions of the display unit 100 in a forward direction or a rearward direction with respect to a display apparatus.

The arc member 210 according to an embodiment may include a first arc member 211 and a second arc member 213.

The first arc member 211 may have a curved shape which is convex toward a first long side of the display unit 100. A center portion (or a length center portion) of the first arc member 211 may be adjacent to the first long side of the display unit 100, and both ends (or both side portions) of the first arc member 211 may be adjacent to a vertical center line VCL of the display unit 100.

The second arc member 213 may have a curved shape which is convex toward a second long side of the display unit 100. A center portion (or a length center portion) of the second arc member 213 may be adjacent to a second long side of the display unit 100, and both ends (or both side portions) of the second arc member 213 may be adjacent to the vertical center line VCL of the display unit 100.

The first arc member 211 and the second arc member 213 may rotate in opposite directions on the basis of driving of the driver 220. Each of the first arc member 211 and the second arc member 213 according to an embodiment may rotate in opposite directions at a fixed position (or in place) on the basis of driving of the driver 220. For example, the first arc member 211 may rotate in a first rotational direction at a fixed position on the basis of driving of the driver 220, and simultaneously, the second arc member 213 may rotate in a second rotational direction at a fixed position on the basis of driving of the driver 220. On the other hand, the first arc member 211 may rotate in the second rotational direction at a fixed position on the basis of driving of the driver 220, and simultaneously, the second arc member 213 may rotate in the first rotational direction at a fixed position on the basis of driving of the driver 220.

A center portion of the first arc member 211 and a center portion of the second arc member 213 may be disposed adjacent to a long side of the display unit 100, and thus, a rear center space of the display unit 100 disposed between the center portion of the first arc member 211 and the center portion of the second arc member 213 may have a relatively wide size, thereby increasing the use of a rear space, where mechanism elements or circuit elements are disposed, of the display unit 100 and enabling the mechanism elements or the circuit elements to be easily disposed.

The guider 230 may be disposed on the rear surface of the display unit 100 in parallel with a second direction Y and may movably support each of a first center portion and a second center portion of the arc member 210. The guider 230 may prevent the partial detachment of the arc member 210 when the arc member 210 having a curved shape is rotating. Therefore, the arc member 210 may be movably disposed in a separation space between the rear surface of the display unit 100 and the center portion of the guider 230, and thus, the guider 230 may prevent the partial detachment of the arc member 210 when the arc member 210 is rotating and both side portions of the display unit 100 may protrude in the forward direction with respect to the display apparatus by using the guider 230 as a supporter.

The guider 230 according to an embodiment may be disposed between a third rear region RA3 and a fourth rear region RA4 of the display unit 100 and may movably support each of the first arc member 211 and the second arc member 213. The guider 230 according to an embodiment may include first to fourth guide members 235 to 238. Each of the first to fourth guide members 235 to 238 may have a structure which differs from that of each of the first to fourth guide members illustrated in FIG. 14 but may have substantially the same function, and thus, their repetitive descriptions are omitted. Optionally, each of the first to fourth guide members 235 to 238 illustrated in FIG. 20 may be implemented to have substantially the same structure as that of each of the first to fourth guide members illustrated in FIG. 14.

The first and third guide members 235 and 237 disposed in the third rear region RA3 of the display unit 100 may be disposed in parallel with each other with a first vertical stiff member 161 therebetween. The second and fourth guide members 236 and 238 disposed in the fourth rear region RA4 of the display unit 100 may be disposed in parallel with each other with a second vertical stiff member 163 therebetween.

Each of the first vertical stiff member 161 and the second vertical stiff member 163 may be disposed on a rear surface of the display unit 100 in parallel with a second direction Y. Each of the first vertical stiff member 161 and the second vertical stiff member 163 according to an embodiment may be implemented to have a certain width parallel to a first direction X and a certain length parallel to the second direction Y. For example, each of the first vertical stiff member 161 and the second vertical stiff member 163 may include a metal material, but is not limited thereto. Each of the first vertical stiff member 161 and the second vertical stiff member 163 may be fixed to the rear surface of the display unit 100 by a coupling member such as a screw or a bolt, but is not limited thereto and may be fixed to the rear surface of the display unit 100 by a coupling member such as a double-sided tape. Each of the first vertical stiff member 161 and the second vertical stiff member 163 may minimize or prevent the vertical distortion of the display unit 100 when a curvature of the display unit 100 varies.

The driver 220 may be disposed in a rear center region of the display unit 100. The driver 220 may be disposed between the first arc member 211 and the second arc member 213.

The driver 220 may simultaneously rotate each of the first arc member 211 and the second arc member 213. The driver 220 may simultaneously rotate the first arc member 211 and the second arc member 213 in opposite rotational directions at a fixed position. For example, the driver 220 may rotate the first arc member 211 by a maximum of 90 degrees in the first rotational direction at a fixed position, and simultaneously, may rotate the second arc member 213 by a maximum of 90 degrees in the second rotational direction at a fixed position. On the other hand, the driver 220 may rotate the first arc member 211 by a maximum of 90 degrees in the second rotational direction at a fixed position, and simultaneously, may rotate the second arc member 213 by a maximum of 90 degrees in the first rotational direction at a fixed position.

The driver 220 may simultaneously rotate the first arc member 211 and the second arc member 213 at a fixed position by using a rectilinear motion based on a rotational motion of a rotary motor.

The driver 220 according to an embodiment may include a supporting plate 221, a holder 222, a fixing link 223, at least one rotary motor 224, and a gear assembly 225.

The supporting plate 221 may be disposed to overlap a rear center portion of a display unit 100. For example, the supporting plate 221 may be implemented to have a certain width parallel to the first direction X and a certain length parallel to the second direction Y and may be disposed on (or coupled to) the rear surface of the back cover 120 to overlap a center portion (or a length center portion) of each of the first arc member 211 and the second arc member 213. The supporting plate 221 may support each of the holder 222, the at least one rotary motor 224, and the gear assembly 225.

The holder 222 may be coupled to the supporting plate 221 and may rotatably support a center portion of the arc member 210. The holder 222 according to an embodiment may include a first holder 222a, which is coupled to the supporting plate 221 to rotatably support a center portion of a first arc member 211, and a second holder 222b which is coupled to the supporting plate 221 to rotatably support a center portion of a second arc member 213. Each of the first holder 222a and the second holder 222b may have a structure which differs from that of each of the first and second holders 222a and 222b illustrated in FIGS. 8 to 10 but may have substantially the same function, and thus, their repetitive descriptions are omitted. Optionally, each of the first holder 222a and the second holder 222b illustrated in FIGS. 21 to 23 may be implemented to have substantially the same structure as that of each of the first and second holders 222a and 222b illustrated in FIGS. 8 to 10.

A fixing link 223 may be fixed to the center portion of the arc member 210. For example, the fixing link 223 may be fixed to the center portion of the arc member 210 by a fixing member FM such as a screw or a bolt.

The fixing link 223 according to an embodiment may include a first fixing link FL1 fixed to the center portion of the first arc member 211 and a second fixing link FL2 fixed to the center portion of the second arc member 213.

Each of the first fixing link FL1 and the second fixing link FL2 may include a pair of link fixing parts LFP which protrude in parallel with the first and second holders 222a and 222b therebetween. For example, the first fixing link FL1 may include a pair of link fixing parts LFP which protrude in parallel with the first holder 222a therebetween. The second fixing link FL2 may include a pair of link fixing parts LFP which protrude in parallel with the second holder 222b therebetween. The pair of link fixing parts LFP may be respectively fixed to the center portions of corresponding arc members 211 and 213 by the fixing member FM.

Figure 24:
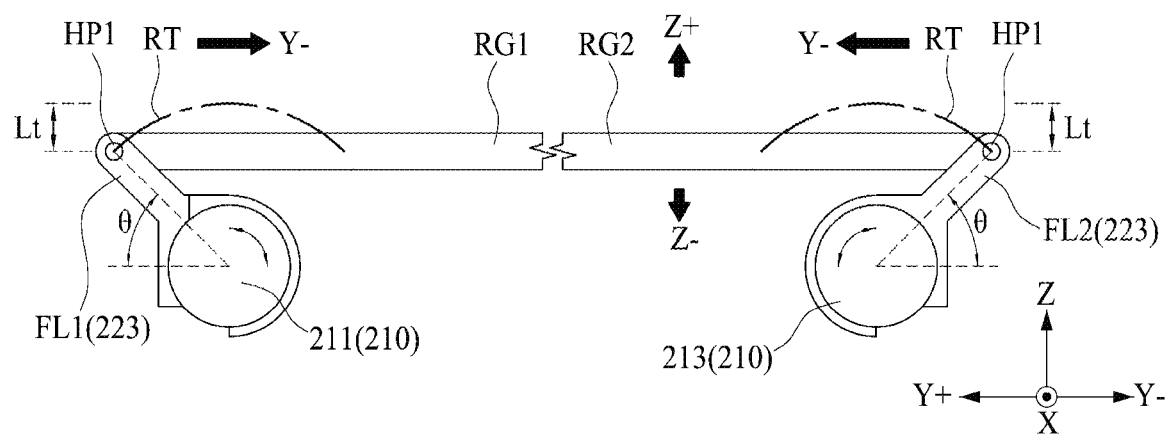
FIG. 24 is a diagram for describing a fixed link illustrated in FIGS. 20, 22, and 23.

The first fixing link FL1, as illustrated in FIG. 24, may be disposed on an outer surface of the first arc member 211 facing a first long side of the display unit 100 and may be disposed to be inclined by a certain angle (θ) with respect to the second direction Y. The first fixing link FL1 may be inclined by a certain angle (θ) from a rear surface of the display unit 100. For example, the first fixing link FL1 may be clockwise inclined by 45 degrees from a vertical line which extends in a thickness direction Z of the display unit 100 from a center axis of the first arc member 211. In this case, an included angle between the rear surface of the display unit 100 and an extension line connecting a center axis of the first fixing link FL1 to the center axis of the first arc member 211 may be about 45 degrees.

The second fixing link FL2, as illustrated in FIG. 24, may be disposed on an outer surface of the second arc member 213 facing a second long side of the display unit 100 and may be disposed to be inclined by a certain angle (θ) with respect to the second direction Y. The second fixing link FL2 may be inclined by a certain angle (θ) from the rear surface of the display unit 100. For example, the second fixing link FL2 may be counterclockwise inclined by 45 degrees from a vertical line which extends in the thickness direction Z of the display unit 100 from a center axis of the second arc member 213. In this case, an included angle between the rear surface of the display unit 100 and an extension line connecting a center axis of the second fixing link FL2 to the center axis of the second arc member 213 may be about 45 degrees.

The at least one rotary motor 224 may be disposed in the rear center region of the display unit 100 and may be supported by the supporting plate 221. The at least one rotary motor 224 may provide a rotational force of the gear assembly 225 in response to manipulation of a user performed for varying a curvature of the display unit 100.

The driver 220 according to the present embodiment may include first and second rotary motors 224*a* and 224*b* (or a pair of rotary motors), for maintaining balance, decreasing noise, and securing a driving force (or rotational force) margin.

The first and second rotary motors 224*a* and 224*b* may be disposed in parallel with each other with the gear assembly 225 therebetween. Each of a driving shaft (or a rotational shaft) of the first rotary motor 224*a* and a driving shaft (or a rotational shaft) of the second rotary motor 224*b* may be disposed to be adjacent to the first arc member 211 or to face the first arc member 211. In this case, the first and second rotary motors 224*a* and 224*b* may rotate in the same direction.

The driving shaft (or the rotational shaft) of the first and second rotary motors 224*a* and 224*b* according to an embodiment may be disposed on the rear surface of the display unit 100 in a state which has rotated by a certain angle to face a short side of the display unit 100.

The gear assembly 225 may be disposed on the supporting plate 221 and may be connected to the rotary motor 224. The gear assembly 225 may rotate the fixing link 223 on the basis of a rotational motion of the rotary motor 224 and may rotate the arc member 210 at a fixed position on the basis of a rotation of the fixing link 223. For example, the gear assembly 225 may rotate the first fixing link FL1 and the second fixing link FL2 of the fixing link 223 in opposite directions on the basis of the rotational motion of the rotary motor 224, and thus, may simultaneously rotate each of the first fixing link FL1 and the second fixing link FL2 at a fixed position. The gear assembly 225 may be referred to as a reduction gear part, but is not limited thereto.

The gear assembly 225 according to an embodiment may include a first rack gear RG1, a second rack gear RG2, a pinion gear PG, and a rotation transfer part RTP. Except for an arrangement structure of gears, the gear assembly 225 including the first rack gear RG1, the second rack gear RG2, the pinion gear PG, and the rotation transfer part RTP may be substantially the same as the gear assembly illustrated in FIG. 8. Hereinafter, therefore, like reference numerals refer to like elements, and their repetitive descriptions are omitted.

The curvature variation unit 200 according to an embodiment may further include a fixing bracket 240.

The fixing bracket 240 may be disposed to be inclined in each of the third rear region RA3 and the fourth rear region RA4 of the display unit 100 and may movably support an end of each of the first arc member 211 and the second arc member 213. The fixing bracket 240 may movably support the end of each of the first arc member 211 and the second arc member 213 and may guide the movement of the end of each of the first arc member 211 and the second arc member 213. To this end, the fixing bracket 240 may include a side groove having a certain depth from an inner surface thereof so that the end of each of the first arc member 211 and the second arc member 213 is movably inserted into the side groove (or a side pocket portion).

The fixing bracket 240 may be disposed on the rear surface of the display unit 100 so as to be inclined by a certain angle with respect to the second direction Y without being parallel to the second direction Y. The fixing bracket 240 according to an embodiment may be disposed to be inclined to correspond to a movement trajectory of the end of each of the first and second arc members 211 and 213 when the first and second arc members 211 and 213 rotate. For example, when the display unit 100 has a flat shape, the end of each of the first and second arc members 211 and 213 may be disposed adjacent to the other end of the fixing bracket 240. Also, when the display unit 100 varies from a flat shape to a curved shape, the end of each of the first and second arc members 211 and 213 may move from the other end of the fixing bracket 240 to the one end of the fixing bracket 240 on the basis of a rotation of each of the first and second arc members 211 and 213.

The fixing bracket 240 according to an embodiment may include first to fourth fixing brackets 241 to 244.

Except for that each of the first to fourth fixing brackets 241 to 244 is disposed on the rear surface of the display unit 100 so as to be inclined by a certain angle with respect to the second direction Y without being parallel to the second direction Y, each of the first to fourth fixing brackets 241 to 244 according to the present embodiment may have a structure which is similar to each of the first to fourth fixing brackets 241 to 244 illustrated in FIG. 6. Hereinafter, therefore, like reference numerals refer to like elements, and their repetitive descriptions are omitted.

One end of each of the first to fourth fixing brackets 241 to 244 may be disposed adjacent to a corner portion of the display unit 100 or a corner portion of the back cover 120. The end of each of the first to fourth fixing brackets 241 to 244 may be disposed to be inclined from the one end thereof to a rear center region of the display unit 100.

With respect to the second direction Y, each of the first to fourth fixing brackets 241 to 244 may be disposed to be inclined to correspond to a movement trajectory of the end of each of the first and second arc members 211 and 213 when the first and second arc members 211 and 213 rotate. In this case, a side groove (or a side pocket portion), which is disposed in an inner surface of each of the first to fourth fixing brackets 241 to 244 and into which the end of each of the first and second arc members 211 and 213 is inserted, may have a certain depth.

For example, as illustrated in FIG. 8, in a case where each of the first to fourth fixing brackets 241 to 244 is disposed in parallel with the second direction Y, each of the first to fourth fixing brackets 241 to 244 should include a side groove having a totally deep depth on the basis of a movement trajectory of each of the first and second arc members 211 and 213, and thus, each of the first to fourth fixing brackets 241 to 244 should have a relatively wide width. On the other hand, as in FIG. 20, in a case where each of the first to fourth fixing brackets 241 to 244 is disposed to be inclined without being parallel to the second direction Y, each of the first to fourth fixing brackets 241 to 244 may include a side groove having a totally shallow depth, based on the movement trajectory of each of the first and second arc members 211 and 213, and thus, each of the first to fourth fixing brackets 241 to 244 may have a relatively narrow width.

The driver 220 of the curvature variation unit 200 according to an embodiment of the present disclosure, as illustrated in FIGS. 22 and 23, may further include a guide rail 226.

The guide rail 226 may be disposed between the supporting plate 221 and the rack gears RG1 and RG2 and may guide a rectilinear motion of each of the rack gears RG1 and RG2.

The guide rail 226 according to an embodiment may include a first guide rail 226a disposed between the supporting plate 221 and the first rack gear RG1 and a second guide rail 226b disposed between the supporting plate 221 and the second rack gear RG2. Each of the first guide rail 226a and the second guide rail 226b is as described above with reference to FIGS. 22 and 23, and thus, like reference numerals refer to like elements and their repetitive descriptions are omitted.

The driver 220 of the curvature variation unit 200 according to an embodiment of the present disclosure may further include a limit switch unit 227.

The limit switch unit 227 may be disposed on the supporting plate 221 so as to be adjacent to the rack gear RG and may limit a maximum distance of a rectilinear motion of each of the rack gear RG. For example, the limit switch unit 227 may be implemented to limit the maximum distance of the rectilinear motion of each of the rack gear RG on the basis of a physical contact with the rack gear RG.

The limit switch unit 227 according to an embodiment may include a first limit switch unit 227a and a second limit switch unit 227b.

The first limit switch unit 227a may limit a maximum rectilinear motion distance of the first rack gear RG1 based on a first rectilinear direction Y+. The first limit switch unit 227a may limit a maximum rotational angle of the arc member 210, or may limit a maximum curvature of the display unit 100.

The first limit switch unit 227a according to an embodiment may include a first limit switch LS1 disposed at the supporting plate 221 so as to be adjacent to the first arc member 211 and a first stopper SP1 protruding from an outer surface of the first rack gear RG1. When the first limit switch LS1 physically contacts the first stopper SP1 disposed in the first rack gear RG1 which performs a rectilinear motion in the first rectilinear direction Y+, the first limit switch LS1 may generate a first limit signal and may provide the first limit signal to the curvature variation control circuit. The curvature variation control circuit may stop a rotation of the rotary motor 224 in response to the first limit signal provided from the first limit switch LS1.

The second limit switch unit 227b may limit a maximum rectilinear motion distance of the second rack gear RG2 based on a second rectilinear direction Y−.

The second limit switch unit 227b according to an embodiment may include a second limit switch LS2 disposed on the supporting plate 221 so as to be adjacent to the pinion gear PG and a second stopper SP2 protruding from an outer surface of the second rack gear RG2. When the second limit switch LS2 physically contacts the second stopper SP2 disposed in the second rack gear RG2 which performs a rectilinear motion in the first rectilinear direction Y+, the second limit switch LS2 may generate a second limit signal and may provide the second limit signal to the curvature variation control circuit. The curvature variation control circuit may stop a rotation of the rotary motor 224 in response to the second limit signal provided from the second limit switch LS2.

The curvature variation unit 200 according to another embodiment of the present disclosure may further include a gear box 278.

The gear box 278 may be coupled to the supporting plate 221 and may support the driver 270.

The gear box 278 may be supported by or mounted on a post of a stand. To this end, the gear box 278 may include a plurality of mount coupling parts 278a. The plurality of mount coupling parts 278a may be disposed at each of an upper side and a lower side of the gear box 278 and may include a horizontal symmetrical structure with respect to the sliding block 274.

Additionally, the gear box 278 may be coupled to the position control unit 700 illustrated in FIG. 19. In this case, a height and an angle of the display apparatus according to the present embodiment may be adjusted based on manipulation of a user performed through the position control unit 700 in a state where the display unit 100 is mounted on the stand 300 through the position control unit 700.

As described above, a display apparatus including the curvature variation unit 200 according to another embodiment of the present disclosure, as illustrated in FIGS. 12A and 12B, may vary from a flat shape to a curved shape or from a curved shape to a flat shape on the basis of driving of the curvature variation unit 200, and thus, its repetitive description is omitted.

A display apparatus according to the present disclosure will be described below.

A display apparatus according to an embodiment of the present disclosure includes: a display unit including a display panel configured to display an image; a curvature variation unit disposed on a rear surface of the display unit and varying a curvature of the display unit; and a vibration unit disposed on the rear surface of the display unit and configured to vibrate the display panel.

According to some embodiments of the present disclosure, the display unit includes a back cover disposed on a rear surface of the display panel and supporting the vibration unit, and the back cover includes a slit overlapping the vibration unit.

According to some embodiments of the present disclosure, the vibration unit includes a pair of sound generating units coupled to the back cover to vibrate the display panel, and the slit is implemented in the back cover overlapping a region between the pair of sound generating units.

According to some embodiments of the present disclosure, each of the pair of sound generating units includes a bobbin and a coil wound around the bobbin, and the bobbin passes through the back cover and is connected to the rear surface of the display panel.

According to some embodiments of the present disclosure, the vibration unit includes: a first vibration unit disposed in a first region of the display unit; and a second vibration unit disposed in a second region of the display unit.

According to some embodiments of the present disclosure, the display unit includes a back cover disposed on the rear surface of the display panel to support each of the first vibration unit and the second vibration unit, each of the first vibration unit and the second vibration unit includes a first sound generating unit and a second generating unit disposed in parallel, and the back cover includes a slit disposed between the first sound generating unit and the second generating unit.

According to some embodiments of the present disclosure, the curvature variation unit includes: an arc member disposed on the rear surface of the display unit; a driver disposed at a rear center portion of the display unit to rotate a center portion of the arc member; a first guide member disposed on the rear surface of the display unit to support a region between the center portion and one end of the arc member; and a second guide member disposed on the rear surface of the display unit to support a region between the center portion and the other end of the arc member.

According to some embodiments of the present disclosure, the curvature variation unit includes: a first arc member and a second arc member respectively disposed in a first rear region and a second rear region of the display unit parallel to a first direction; a guider disposed in each of a third rear region and a fourth rear region of the display unit parallel to a second direction intersecting with the first direction to support each of the first arc member and the second arc member; a fixing bracket disposed in each of the third rear region and the fourth rear region of the display unit to movably support an end of each of the first arc member and the second arc member; and a driver disposed in a rear center region of the display unit to simultaneously rotate a center portion of each of the first arc member and the second arc member.

According to some embodiments of the present disclosure, each of the first arc member and the second arc member has a curved shape and rotates in opposite directions on the basis of driving of the driver.

According to some embodiments of the present disclosure, each of the first arc member and the second arc member has a curved shape, and a center portion of each of the first arc member and the second arc member is adjacent to a rear center portion of the display unit, and an end of each of the first arc member and the second arc member is adjacent to a corner portion of the display unit.

According to some embodiments of the present disclosure, the driver includes: a first holder rotatably supporting a center portion of the first arc member; a second holder rotatably supporting a center portion of the second arc member; a first fixing link fixed to a center portion of the first arc member; a second fixing link fixed to a center portion of the second arc member; at least one rotary motor; a first rack gear rotating the first fixing link; a second rack gear rotating the second fixing link; a pinion gear connected between the first rack gear and the second rack gear; and a rotation transfer part rotating the pinion gear on the basis of a rotation of the at least one rotary motor.

According to some embodiments of the present disclosure, the curvature variation unit includes: a first arc member and a second arc member respectively disposed in a first rear region and a second rear region of the display unit parallel to a first direction; a guider disposed in each of a third rear region and a fourth rear region of the display unit parallel to a second direction intersecting with the first direction to support each of the first arc member and the second arc member; a fixing bracket disposed in each of a third rear edge portion and a fourth rear edge portion of the display unit; a joint member rotatably disposed in the fixing bracket and inserted into an end of each of the first arc member and the second arc member; and a driver disposed in a rear center portion of the display unit to simultaneously rotate a center portion of each of the first arc member and the second arc member.

According to some embodiments of the present disclosure, each of the first arc member and the second arc member has a curved shape and rotates in the same direction while moving in the same direction, based on driving of the driver.

According to some embodiments of the present disclosure, the driver includes: a guide plate disposed on the rear surface of the display unit, the guide plate including a guide rail; a first holder link disposed on one side of the guide plate to rotatably support a center portion of the first arc member; a second holder link disposed on the other side of the guide plate to rotatably support a center portion of the second arc member; a sliding block including one or a pair of rack gears connected between the first holder link and the second holder link and slidably disposed in the guide rail; one or a pair of pinion gears sliding the one or pair of rack gears; one or a pair of rotary motors; and a rotation transfer part rotating the one or pair of pinion gears on the basis of a rotation of the one or pair of rotary motors.

According to some embodiments of the present disclosure, the curvature variation unit includes: a first arc member and a second arc member respectively disposed in a first rear region and a second rear region of the display unit parallel to a first direction; a guider disposed in each of a third rear region and a fourth rear region of the display unit parallel to a second direction intersecting with the first direction to support each of the first arc member and the second arc member; a fixing bracket disposed in each of the third rear region and the fourth rear region of the display unit to movably support an end of each of the first arc member and the second arc member; and a driver disposed in a rear center region of the display unit to simultaneously rotate a center portion of each of the first arc member and the second arc member, and the fixing bracket is disposed to be inclined with respect to the second direction.

According to some embodiments of the present disclosure, each of the first arc member and the second arc member has a curved shape and rotates in opposite directions on the basis of driving of the driver.

According to some embodiments of the present disclosure, the driver includes: a first holder rotatably supporting a center portion of the first arc member; a second holder rotatably supporting a center portion of the second arc member; a first fixing link fixed to a center portion of the first arc member; a second fixing link fixed to a center portion of the second arc member; at least one rotary motor; a first rack gear rotating the first fixing link; a second rack gear rotating the second fixing link; a pinion gear connected between the first rack gear and the second rack gear; and a rotation transfer part rotating the pinion gear on the basis of a rotation of the at least one rotary motor.

A display apparatus according to an embodiment of the present disclosure includes: a display unit including a display panel configured to display an image; and a curvature variation unit disposed on a rear surface of the display unit and varying a curvature of the display unit, wherein the curvature variation unit includes: a first arc member and a second arc member respectively disposed in a first rear region and a second rear region of the display unit parallel to a first direction, each of the first arc member and the second arc member having a curved shape; a driver disposed in a rear center region of the display unit to simultaneously rotate a center portion of each of the first arc member and the second arc member; a guider disposed on the rear surface of the display unit in parallel with a second direction intersecting with the first direction to movably support a center portion between a center portion and both ends of each of the first arc member and the second arc member; and a fixing bracket disposed in each of a third rear edge portion and a fourth rear edge portion of the display unit parallel to the second direction intersecting with the first direction, and the fixing bracket transfers pressure, applied to an end of each of the first arc member and the second arc member rotating based on driving of the driver, to each of the third rear edge portion and the fourth rear edge portion of the display unit.

According to some embodiments of the present disclosure, the fixing bracket movably supports the end of each of the first arc member and the second arc member.

According to some embodiments of the present disclosure, the fixing bracket is disposed to be inclined with respect to the second direction.

According to some embodiments of the present disclosure, the curvature variation unit further includes a joint member rotatably disposed in the fixing bracket, and the joint member includes: a pin portion inserted into the end of each of the first arc member and the second arc member; and a ring portion connected to an end of the pin portion and rotatably disposed in the fixing bracket.

According to some embodiments of the present disclosure, the display apparatus further includes a vibration unit disposed on the rear surface of the display unit to vibrate the display panel so that a sound is output based on the vibration of the display panel.

According to some embodiments of the present disclosure, the display unit includes a back cover disposed on a rear surface of the display panel to support the vibration unit, the vibration unit includes a pair of sound generating units coupled to the back cover to vibrate the display panel, and the back cover includes a slit overlapping a region between the pair of sound generating units.

The display apparatus further includes a rear curtain unit disposed on the rear surface of the display panel to cover the curvature variation unit.

According to some embodiments of the present disclosure, the rear curtain unit includes: a curtain edge frame connected to a rear edge portion of the display unit, the curtain edge frame including a first opening portion; a curtain rear frame connected to the curtain edge frame, the curtain rear frame including a second opening portion overlapping with the first opening portion; and a plurality of curtain members disposed apart from the second opening portion of the curtain rear frame.

The display apparatus according to the present disclosure may maintain a display panel as a flat type or may vary (or change) a curvature of the display panel, based on a selection (or preference) of a user (or a viewer).

Moreover, the display apparatus according to the present disclosure may vary a curvature of a display panel and may output a sound in a forward direction with respect to the display panel, thereby simultaneously maximizing the immersion of a user (or a viewer) watching an image.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations may be made in the display apparatus of the present disclosure without departing from the technical idea or scope of the disclosure. Thus, it is intended that the present disclosure covers the modifications and variations of this disclosure provided they come within the scope of the appended claims and their equivalents.

What is claimed is:

1. A display apparatus, comprising:
    a display unit including a display panel configured to display an image;
    a curvature variation unit disposed on a rear surface of the display unit and varying a curvature of the display unit; and
    a vibration unit disposed on the rear surface of the display unit and configured to vibrate the display panel,
    wherein the curvature variation unit comprises:
        a first arc member and a second arc member respectively disposed in a first rear region and a second rear region of the display unit parallel to a first direction;
        a guider disposed in each of a third rear region and a fourth rear region of the display unit parallel to a second direction intersecting with the first direction to support each of the first arc member and the second arc member;
        a fixing bracket disposed in each of the third rear region and the fourth rear region of the display unit to movably support an end of each of the first arc member and the second arc member; and
        a driver disposed in a rear center region of the display unit to simultaneously rotate a center portion of each of the first arc member and the second arc member, and
    wherein the driver comprises:
        a first holder rotatably supporting a center portion of the first arc member;
        a second holder rotatably supporting a center portion of the second arc member;
        a first fixing link fixed to a center portion of the first arc member;
        a second fixing link fixed to a center portion of the second arc member;
        at least one rotary motor;
        a first rack gear rotating the first fixing link;
        a second rack gear rotating the second fixing link;
        a pinion gear connected between the first rack gear and the second rack gear; and
        a rotation transfer part rotating the pinion gear on the basis of a rotation of the at least one rotary motor.

2. The display apparatus of claim 1, wherein
    the display unit comprises a back cover disposed on a rear surface of the display panel and supporting the vibration unit, and
    the back cover comprises a slit overlapping the vibration unit.

3. The display apparatus of claim 2, wherein
    the vibration unit comprises a pair of sound generating units coupled to the back cover to vibrate the display panel, and
    the slit is implemented in the back cover overlapping a region between the pair of sound generating units.

4. The display apparatus of claim 3, wherein
each of the pair of sound generating units comprises a bobbin and a coil wound around the bobbin, and
the bobbin passes through the back cover and is connected to the rear surface of the display panel.

5. The display apparatus of claim 1, wherein the vibration unit comprises:
a first vibration unit disposed in a first region of the display unit; and
a second vibration unit disposed in a second region of the display unit.

6. The display apparatus of claim 5, wherein
the display unit comprises a back cover disposed on the rear surface of the display panel to support each of the first vibration unit and the second vibration unit,
each of the first vibration unit and the second vibration unit comprises a first sound generating unit and a second generating unit disposed in parallel, and
the back cover comprises a slit disposed between the first sound generating unit and the second generating unit.

7. The display apparatus of claim 1, wherein each of the first arc member and the second arc member has a curved shape and rotates in opposite directions on the basis of driving of the driver.

8. The display apparatus of claim 1, wherein
each of the first arc member and the second arc member has a curved shape, and
a center portion of each of the first arc member and the second arc member is adjacent to a rear center portion of the display unit, and an end of each of the first arc member and the second arc member is adjacent to a corner portion of the display unit.

9. A display apparatus, comprising:
a display unit including a display panel configured to display an image;
a curvature variation unit disposed on a rear surface of the display unit and varying a curvature of the display unit; and
a vibration unit disposed on the rear surface of the display unit and configured to vibrate the display panel,
wherein the curvature variation unit comprises:
a first arc member and a second arc member respectively disposed in a first rear region and a second rear region of the display unit parallel to a first direction;
a guider disposed in each of a third rear region and a fourth rear region of the display unit parallel to a second direction intersecting with the first direction to support each of the first arc member and the second arc member;
a fixing bracket disposed in each of a third rear edge portion and a fourth rear edge portion of the display unit;
a joint member rotatably disposed in the fixing bracket and inserted into an end of each of the first arc member and the second arc member; and
a driver disposed in a rear center portion of the display unit to simultaneously rotate a center portion of each of the first arc member and the second arc member.

10. The display apparatus of claim 9, wherein each of the first arc member and the second arc member has a curved shape and rotates in the same direction while moving in the same direction, based on driving of the driver.

11. The display apparatus of claim 9, wherein the driver comprises:
a guide plate disposed on the rear surface of the display unit, the guide plate including a guide rail;
a first holder link disposed on one side of the guide plate to rotatably support a center portion of the first arc member;
a second holder link disposed on the other side of the guide plate to rotatably support a center portion of the second arc member;
a sliding block including one or a pair of rack gears connected between the first holder link and the second holder link and slidably disposed in the guide rail;
one or a pair of pinion gears sliding the one or pair of rack gears;
one or a pair of rotary motors; and
a rotation transfer part rotating the one or pair of pinion gears on the basis of a rotation of the one or pair of rotary motors.

12. A display apparatus, comprising:
a display unit including a display panel configured to display an image;
a curvature variation unit disposed on a rear surface of the display unit and varying a curvature of the display unit; and
a vibration unit disposed on the rear surface of the display unit and configured to vibrate the display panel,
wherein the curvature variation unit comprises:
a first arc member and a second arc member respectively disposed in a first rear region and a second rear region of the display unit parallel to a first direction;
a guider disposed in each of a third rear region and a fourth rear region of the display unit parallel to a second direction intersecting with the first direction to support each of the first arc member and the second arc member;
a fixing bracket disposed in each of the third rear region and the fourth rear region of the display unit to movably support an end of each of the first arc member and the second arc member; and
a driver disposed in a rear center region of the display unit to simultaneously rotate a center portion of each of the first arc member and the second arc member, and
the fixing bracket is disposed to be inclined with respect to the second direction.

13. The display apparatus of claim 12, wherein each of the first arc member and the second arc member has a curved shape and rotates in opposite directions on the basis of driving of the driver.

14. The display apparatus of claim 12, wherein the driver comprises:
a first holder rotatably supporting a center portion of the first arc member;
a second holder rotatably supporting a center portion of the second arc member;
a first fixing link fixed to a center portion of the first arc member;
a second fixing link fixed to a center portion of the second arc member;
at least one rotary motor;
a first rack gear rotating the first fixing link;
a second rack gear rotating the second fixing link;
a pinion gear connected between the first rack gear and the second rack gear; and
a rotation transfer part rotating the pinion gear on the basis of a rotation of the at least one rotary motor.

15. A display apparatus, comprising:
a display unit including a display panel configured to display an image;

a curvature variation unit disposed on a rear surface of the display unit and varying a curvature of the display unit; and a rear curtain unit disposed on the rear surface of the display panel to cover the curvature variation unit, wherein the curvature variation unit comprises:

a first arc member and a second arc member respectively disposed in a first rear region and a second rear region of the display unit parallel to a first direction, each of the first arc member and the second arc member having a curved shape;

a driver disposed in a rear center region of the display unit to simultaneously rotate a center portion of each of the first arc member and the second arc member;

a guider disposed on the rear surface of the display unit in parallel with a second direction intersecting with the first direction to movably support a center portion between a center portion and both ends of each of the first arc member and the second arc member; and a fixing bracket disposed in each of a third rear edge portion and a fourth rear edge portion of the display unit parallel to the second direction intersecting with the first direction, and the fixing bracket transfers pressure, applied to an end of each of the first arc member and the second arc member rotating based on driving of the driver, to each of the third rear edge portion and the fourth rear edge portion of the display unit, and wherein the rear curtain unit comprises:

a curtain edge frame connected to a rear edge portion of the display unit, the curtain edge frame including a first opening portion;

a curtain rear frame connected to the curtain edge frame, the curtain rear frame including a second opening portion overlapping with the first opening portion; and a plurality of curtain members disposed apart from the second opening portion of the curtain rear frame.

16. The display apparatus of claim 15, wherein the fixing bracket movably supports the end of each of the first arc member and the second arc member.

17. The display apparatus of claim 16, wherein the fixing bracket is disposed to be inclined with respect to the second direction.

18. The display apparatus of claim 15, wherein the curvature variation unit further comprises a joint member rotatably disposed in the fixing bracket, and wherein the joint member comprises:

a pin portion inserted into the end of each of the first arc member and the second arc member; and a ring portion connected to an end of the pin portion and rotatably disposed in the fixing bracket.

19. The display apparatus of claim 15, further comprises a vibration unit disposed on the rear surface of the display unit configured to vibrate the display panel.

20. The display apparatus of claim 19, wherein:

the display unit comprises a back cover disposed on a rear surface of the display panel to support the vibration unit, the vibration unit comprises a pair of sound generating units coupled to the back cover to vibrate the display panel, and the back cover comprises a slit overlapping a region between the pair of sound generating units.

* * * * *